(12) United States Patent
Eveleigh

(10) Patent No.: US 11,560,201 B2
(45) Date of Patent: Jan. 24, 2023

(54) BICYCLE DRIVETRAIN

(71) Applicant: Cedric Eveleigh, Ottawa (CA)

(72) Inventor: Cedric Eveleigh, Ottawa (CA)

(73) Assignee: Lal Bikes Inc.

( * ) Notice: Subject to any disclaimer, the term of this patent is extended or adjusted under 35 U.S.C. 154(b) by 230 days.

(21) Appl. No.: 17/091,113

(22) Filed: Nov. 6, 2020

(65) Prior Publication Data

US 2021/0354782 A1 Nov. 18, 2021

(30) Foreign Application Priority Data

May 14, 2020 (CA) .................................. CA 3080960

(51) Int. Cl.
B62M 9/16 (2006.01)
B62M 9/126 (2010.01)
B62K 25/28 (2006.01)

(52) U.S. Cl.
CPC .............. *B62M 9/16* (2013.01); *B62M 9/126* (2013.01); *B62K 25/28* (2013.01)

(58) Field of Classification Search
CPC .......... B62M 9/16; B62M 9/126; B62K 25/28
USPC ......................................................... 474/82
See application file for complete search history.

(56) References Cited

U.S. PATENT DOCUMENTS

| | | | | |
|---|---|---|---|---|
| 2,507,416 A | * | 5/1950 | Needham | ................. B62M 9/16 474/80 |
| 3,398,973 A | * | 8/1968 | Shimano | ................. B62M 9/16 474/134 |
| 3,785,219 A | | 1/1974 | Anthamatten | |
| 5,013,285 A | * | 5/1991 | Carlyle | .................... B62M 9/12 280/250 |
| 5,213,549 A | | 5/1993 | Blanchard | |
| 5,762,353 A | * | 6/1998 | Miller | .................... B62K 25/28 280/288.3 |
| 6,793,598 B1 | | 9/2004 | Savard | |
| 7,258,637 B2 | | 8/2007 | Thomasberg | |
| 9,400,037 B2 | | 7/2016 | Hara | |

(Continued)

FOREIGN PATENT DOCUMENTS

| | | | | |
|---|---|---|---|---|
| CN | 109436179 | * | 3/2019 | ............ B62M 9/126 |
| CN | 209336930 | | 9/2019 | |

(Continued)

OTHER PUBLICATIONS

International Search Report issued in PCT/CA2021/050641 dated Jul. 20, 2021 (3 pages).

(Continued)

*Primary Examiner* — Gene O Crawford
*Assistant Examiner* — Emily R Kincaid
(74) *Attorney, Agent, or Firm* — Baumgartner Patent Law; Marc Baumgartner

(57) ABSTRACT

A bicycle drivetrain having a rear derailleur, a chain tensioner, and a chain guiding element which can be an idler pulley. The chain tensioner is separate from the rear derailleur and can be placed near the pedal crank. The bicycle to which the drivetrain is mounted has a drive chain, and the position of the lower portion of the drive chain (i.e. the portion of the drive chain that is not tensioned from pedaling forces) is elevated relative to that of bicycles with drivetrains having conventional rear derailleurs.

20 Claims, 14 Drawing Sheets

(56) References Cited

U.S. PATENT DOCUMENTS

| | | | | |
|---|---|---|---|---|
| 2009/0258738 A1* | 10/2009 | Hara | ........................ | B62M 9/16 |
| | | | | 474/122 |
| 2014/0235388 A1* | 8/2014 | Chang | ...................... | B62M 9/16 |
| | | | | 474/135 |
| 2015/0072816 A1* | 3/2015 | Yamaguchi | ........... | F16H 7/0829 |
| | | | | 474/113 |

FOREIGN PATENT DOCUMENTS

| | | | | |
|---|---|---|---|---|
| EP | 2511167 A1 * | 10/2012 | ............ | B62M 9/131 |
| FR | 736594 | 11/1932 | | |
| FR | 819641 | 10/1937 | | |
| RU | 2184673 | 7/2002 | | |

OTHER PUBLICATIONS

Written Opinion issued in PCT/CA2021/050641 dated Jul. 20, 2021 (4 pages).

* cited by examiner

BICYCLE DRIVETRAIN

FIELD OF THE INVENTION

The invention relates generally to bicycles, and more specifically, to bicycle drivetrains.

BACKGROUND

Bicycle drivetrains with rear derailleurs are known in the art. The primary purpose of the rear derailleur, in combination with the handlebar-mounted shifter, is to allow the bicycle rider to control which of several cassette sprockets is engaged with the drive chain.

Rear derailleurs comprise a base member fastened to the frame near the rear hub axle and a parallelogram link mechanism that supports a movable member relative to the base member. In conventional rear derailleurs (i.e. the rear derailleurs that are widely used on modern bicycles), a chain guide is rotatably connected to the movable member and includes a pair of vertically aligned pulleys. These pulleys are moved from side to side in the direction of the rear wheel axis to change which cassette sprocket is engaged with the drive chain. The chain guide is connected to the movable member by a pivot that is substantially parallel to the rear wheel axis and that is spring-loaded to create a torque on the chain guide in a clockwise direction when viewed laterally outwardly from the drivetrain (i.e. when viewed laterally from an outward viewing position from the drivetrain). This torque on the chain guide maintains the drive chain in a tensioned state or restores a tensioned state after an antecedent state of insufficient drive chain tension. The chain guide will take various rotational positions relative to the movable member depending on which cassette sprocket is engaged with the drive chain. To maintain adequate drive chain tension during riding over uneven surfaces, some conventional rear derailleurs feature a damper that provides resistance to rotational movement of the chain guide in its rotational direction opposite the chain tensioning direction. In this respect, some known solutions have a one-way clutch and a friction unit, which act together in such a way so that friction is only present in the rotational direction opposite the chain tensioning direction.

Conventional rear derailleurs present a disadvantage that is especially problematic for mountain bikes. The position and geometry of conventional rear derailleurs make them prone to receiving impacts, such as during crashes and from protruding trail features during riding. These impacts frequently cause the failure of conventional rear derailleurs or of the derailleur hangers to which they are attached. As a result, conventional rear derailleurs are an unreliable component on bicycles.

Some prior art solutions have attempted to reduce the need for rear derailleurs—and thus address the reliability issue associated with conventional rear derailleurs—by placing gear changing mechanisms within sealed gearboxes (or sealed transmission units). However, compared to drivetrains with conventional rear derailleurs, drivetrains with gearboxes shift poorly when under load from pedaling forces and they are mechanically inefficient. Accordingly, there exists a need for an improved bicycle drivetrain that retains the reliability of drivetrains with gearboxes and the shifting-under-load capabilities and mechanical efficiency of drivetrains with conventional rear derailleurs.

Rear derailleurs can have increased ground clearance and improved reliability if their chain tensioning functionality is transferred to a separate component (termed a "chain tensioner"). Bicycle drivetrains with a chain tensioner and a rear derailleur without chain tensioning functionality are known in the art. However, for these drivetrains to be more reliable than drivetrains with conventional rear derailleurs, the chain tensioner should also be reliable.

French Patent Number 736,594, which issued to Egg on Nov. 25, 1932, discloses a bicycle drivetrain with a rear derailleur and a chain tensioner that is separate from the rear derailleur. The rear derailleur has no chain tensioning functionality. The chain tensioner comprises a frame mount and a chain guide that is rotatably mounted to the frame mount by a pivot that is near the bottom bracket shell and parallel to the bottom bracket axis. The chain guide features a single pulley, and the lower portion of the drive chain (i.e. the portion of the drive chain that is not tensioned from pedaling forces) is carried below this pulley. The drive chain is tensioned by counter-clockwise rotation of the chain guide when viewed laterally outwardly from the drivetrain. A disadvantage of this drivetrain is that the chain guide is vulnerable to impacts, such as from protruding trail features and during crashes, similarly to how conventional rear derailleurs are vulnerable to impacts. Thus, this drivetrain offers little to no improvement in reliability compared to drivetrains with conventional rear derailleurs.

French Patent Number 819,641, which issued to Lambert on Oct. 22, 1937, discloses a bicycle drivetrain which also has a rear derailleur with no chain tensioning functionality. This drivetrain has a similar chain tensioner to that described above (from French Patent Number 736,594), except that the chain tensioner is configured with the lower portion of the drive chain carried on top of (rather than below) the pulley of the chain guide. Disadvantageously, the position of the upper portion of the drive chain (i.e. the portion of the drive chain that is tensioned from pedaling forces) limits the possible range of motion of the chain guide; as a result, the maximum possible cassette sprocket size range is significantly less than the cassette sprocket size ranges of modern bicycles.

The present lack of commercially-available bicycle drivetrains with both a rear derailleur and a chain tensioner that is separate from the rear derailleur supports the foregoing discussion about the disadvantages of prior implementations of these types of drivetrains.

SUMMARY

The present invention provides a drivetrain particularly suitable for mountain bikes. The drivetrain is designed to be mounted to a bicycle which has a frame with a bottom bracket shell. The bicycle has a rotatable pedal crank mounted about the bottom bracket shell for rotation by pedaling actuation about the bottom bracket shell axis. The pedal crank has a chainring sprocket. The bicycle further has cassette with a plurality of sprockets mounted at the rear wheel, and a drive chain engaging the pedal crank and the cassette. The drive chain, as commonly known, serves to transmit pedaling actuation. When mounted, the drive chain has an upper portion and a lower portion. The drivetrain comprises:

1. a rear derailleur mounted to the frame and configured to move the drive chain between the plurality of the cassette sprockets;
2. a chain tensioner, advantageously separate from the rear derailleur and mounted to the frame, and comprising a tensioner chain guide and a biasing element configured for producing tension on the drive chain; and 3. a chain guiding element mounted to the frame and disposed to engage the upper portion of the drive chain, such that the upper portion of the drive chain is carried above the chain guiding element;
4. wherein the drive chain is advantageously disposed generally above a clearance line as described in detail below.

Figure 1:
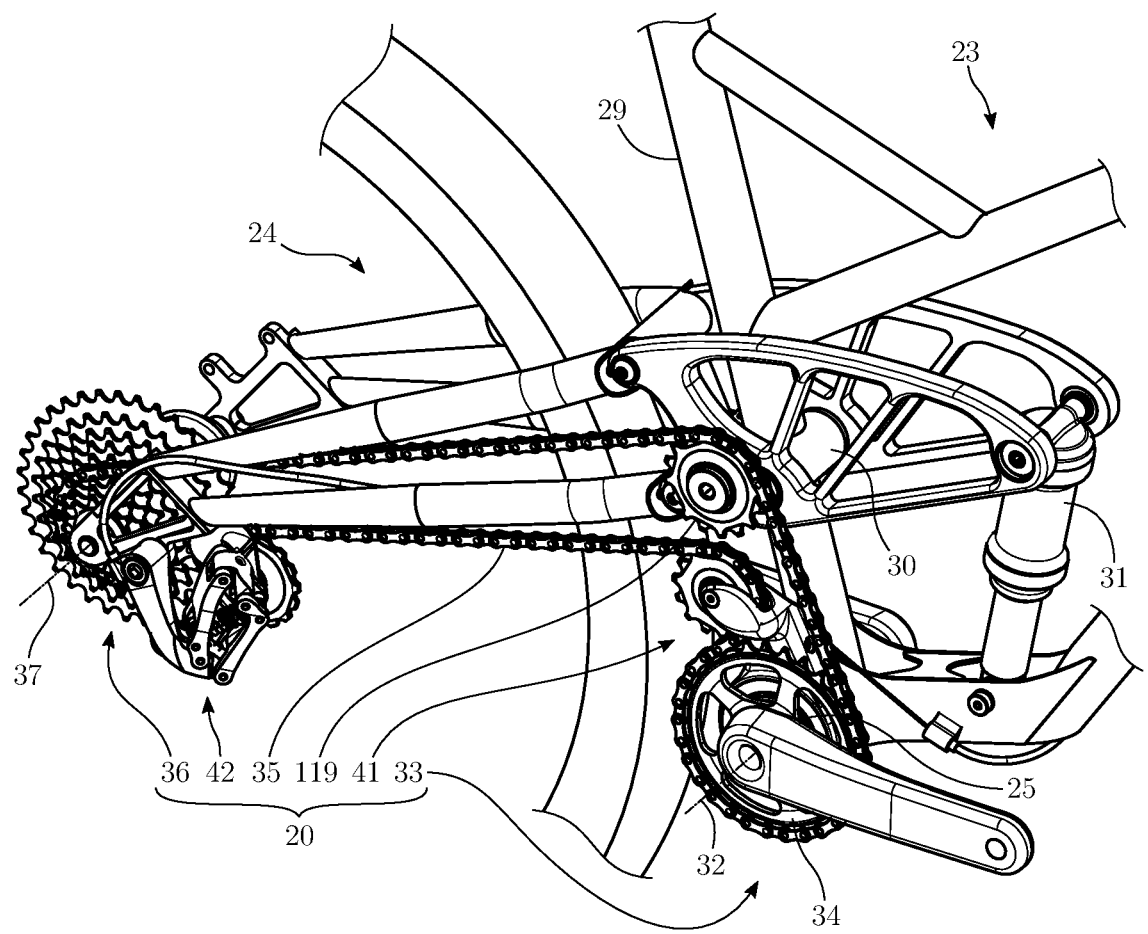
FIG. 1 is an isometric view of the drivetrain of the bicycle in accordance with a first embodiment.

| | |
|---|---|
| 20 | drivetrain |
| 21 | bicycle |
| 22 | frame |
| 23 | front frame portion |
| 24 | rear frame portion |
| 25 | bottom bracket shell |
| 26 | down tube |
| 27 | front wheel |
| 28 | rear wheel |
| 29 | seat tube |
| 30 | suspension pivot |
| 31 | shock absorber |
| 32 | bottom bracket shell axis |
| 33 | pedal crank |
| 34 | chainring sprocket |
| 35 | drive chain |
| 36 | cassette |
| 37 | cassette sprocket axis |
| 38 | active sprocket |
| 39 | smallest sprocket |
| 40 | largest sprocket |
| 41 | chain tensioner |
| 42 | rear derailleur |
| 43 | derailleur base member |
| 44 | mounting bolt |
| 45 | movable member |
| 46 | parallelogram four-pivot articulation |
| 47 | parallelogram axes |
| 48 | lower link arm |
| 49 | upper link arm |
| 50 | derailleur chain guide |
| 51 | guide pulley |
| 52 | guide pulley axis |
| 53 | drive direction of rotation |
| 54 | first guiding plate |
| 55 | second guiding plate |
| 56 | bridge |
| 57 | pusher plate |
| 58 | first pivot pin |
| 59 | second pivot pin |
| 60 | third pivot pin |
| 61 | fourth pivot pin |
| 62 | shift cable |
| 63 | shift cable housing |
| 64 | shift cable guide |
| 65 | through bore |
| 66 | shift cable anchor |
| 67 | derailleur arcuate surface |
| 68 | derailleur biasing element |
| 69 | first spring mount pin |
| 70 | second spring mount pin |
| 71 | tensioner base member |
| 72 | flange |
| 73 | tensioner chain guide |
| 74 | tensioner chain guide body |
| 75 | tension pulley |
| 76 | tensioner bearing |
| 77 | elastic seal |
| 78 | tension pulley axis |
| 79 | biasing assembly |
| 80 | tensioner biasing element |
| 81 | chain tensioning direction |
| 82 | fixed spring mount |
| 83 | movable spring mount |
| 84 | tensioner cable |
| 85 | tensioner cable housing |
| 86 | expansion collar |
| 87 | housing stop |
| 88 | tensioner cable anchor |
| 89 | guiding tube |
| 90 | chain slackening direction |
| 91 | spring mount sleeve |
| 92 | spring mount bolt |
| 93 | through bore section |
| 94 | spring mount pin |
| 95 | slotted opening |

| | |
|---|---|
| 96 | first through bore section |
| 97 | second through bore section |
| 98 | third through bore section |
| 99 | expansion collar body |
| 100 | expansion collar tongues |
| 101 | collar bolt |
| 102 | wedge |
| 103 | tensioner arcuate surface |
| 104 | recessed portion |
| 105 | damper |
| 106 | one-way clutch assembly |
| 107 | friction assembly |
| 108 | ratchet ring |
| 109 | pawls |
| 110 | elastic member |
| 111 | slots |
| 112 | ratchet ring frictional portion |
| 113 | chain guide frictional portion |
| 114 | ratchet teeth |
| 115 | wedge member |
| 116 | movable friction member |
| 117 | wedge bolt |
| 118 | cavity |
| 119 | idler pulley |
| 120 | derailleur chain guide path |
| 121 | clearance line |
| 122 | first spring mount |
| 123 | second spring mount |
| 124 | spring retention plate |
| 125 | second tension pulley |

DETAILED DESCRIPTION OF EMBODIMENTS

In the figures, an embodiment of a drivetrain of the present disclosure is referred to in general as 20.

Figure 2:
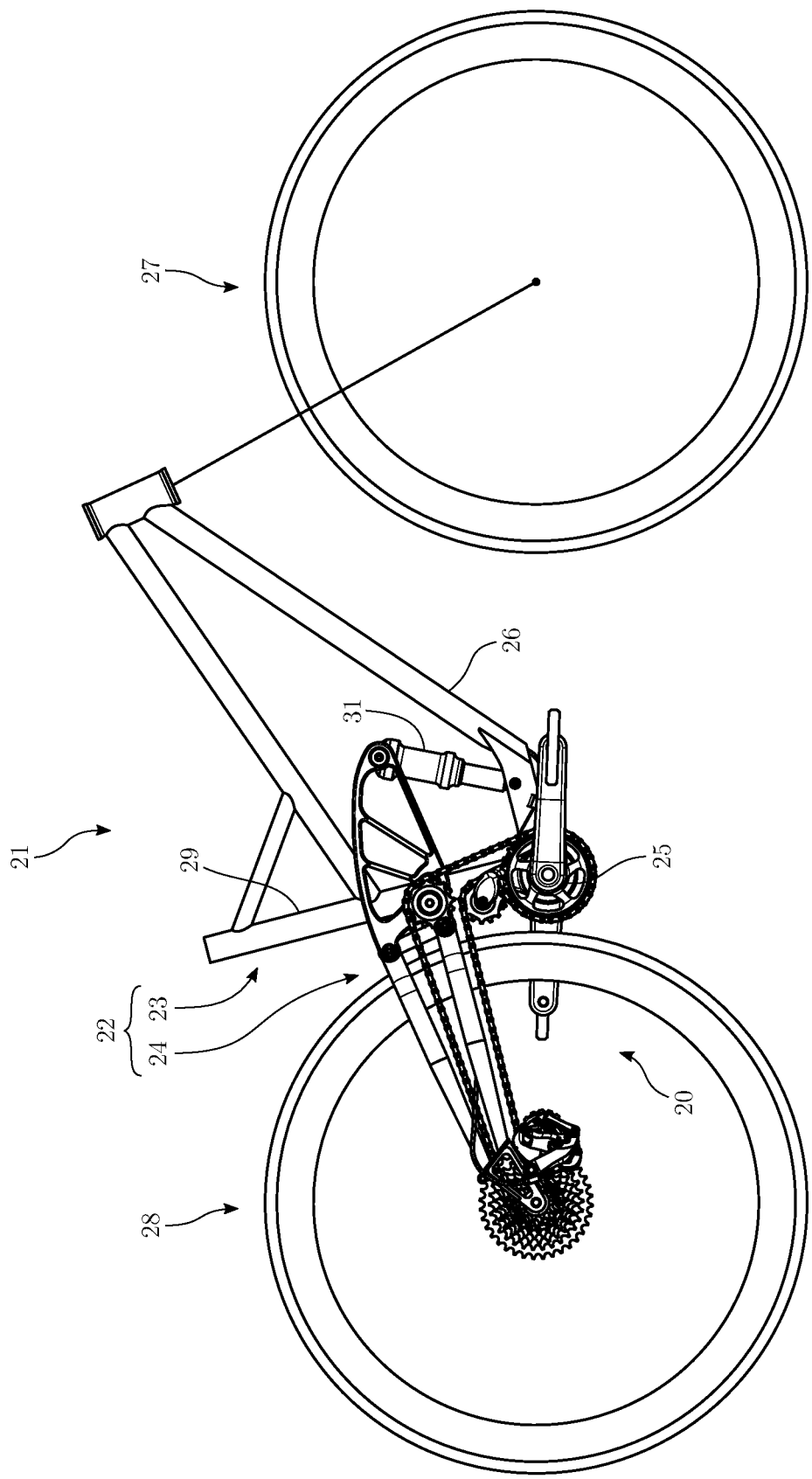
FIG. 2 is a side elevational view of the bicycle in accordance with the first embodiment.

FIG. 2 illustrates a bicycle 21 equipped with the drivetrain 20 in accordance with the exemplary embodiment. While the bicycle 21 is illustrated as a mountain bike, the drivetrain 20 can be applied to road bikes or any type of bicycle. The bicycle 21 can take many different configurations and can have a different frame and a different configuration of components than that shown in the figures. The bicycle 21 can be entirely driven by pedal power, or can be partially or entirely driven by a motive force supplied by an electric motor.

The bicycle 21 has a frame 22 which may be either a suspended frame (or "fully suspended" frame, i.e. one having rear suspension) or a rigid frame (or "hardtail" frame, i.e. one having no rear suspension). Irrespective of its shape or configuration, the frame 22 of the present disclosure has a front frame portion 23 (or main frame), a rear frame portion 24, and a bottom bracket shell 25, all of which are described in greater detail below.

The front frame portion 23 forms the front of the frame 22 and includes at least a down tube 26 and can also include a top tube, a head tube, etc. The front frame portion 23 is preferably equipped with a front wheel fork to which is attached at its most forward end a front wheel 27 which rotates about a front wheel axis. The front frame portion 23 can be further equipped with a handlebar, a saddle, a front brake, etc. Indeed, the front frame portion 23 can be equipped with many other components, depending on the configuration of the bicycle 21 and its intended use, among other possible factors.

The rear frame portion 24 forms the rear of the frame 22 and can include stays, such as seat stays and chain stays. The rear frame portion 24 is attached at its rearmost end to a rear wheel 28 which rotates about a rear wheel axis. The rear frame portion 24 links the rear wheel 28 to the front frame portion 23. The rear frame portion 24 can be further equipped with other bicycle components, such as a rear brake.

Reference is now made to FIG. 1, which is an enlarged view of the drivetrain 20 on the bicycle 21 of FIG. 2. The front frame portion 23 and the rear frame portion 24 meet generally in the vicinity of the seat tube 29. In the exemplary embodiment shown in FIG. 1, the front frame portion 23 is mounted to the rear frame portion 24 by a suspension pivot 30 and a shock absorber 31, which, together with the rear frame portion 24, form a rear suspension system. This type of arrangement is referred to as a "single-pivot" suspension system because the rear frame portion 24 pivots about a single fixed point on the front frame portion 23. The rear frame portion 24 in a single-pivot suspension system may also be referred to as a "swing arm".

The rear suspension system can take many different configurations than that which is described above and shown in FIG. 1 and FIG. 2. For example, the rear suspension system can include a plurality of linkages and a plurality of pivots (in configurations such as four-bar or six-bar linkages), it can include flexible structural members, and it can include members that are slidable on linear tracks.

Referring to FIG. 1, the bottom bracket shell 25 is part of the frame 22 and is essentially a hollow tubular portion extending between the left and right sides of the bicycle 21 along a bottom bracket shell axis 32. A pedal crank 33 is rotatably mounted to the bottom bracket shell 25 and is adapted to receive pedaling actuation, or an input of force, from a rider of the bicycle 21. The pedal crank 33 is therefore supported by suitable bearings so that it can rotate with respect to the stationary bottom bracket shell 25 about the bottom bracket shell axis 32.

The pedal crank 33 includes a chainring sprocket 34 (or front sprocket) which engages a drive chain 35. The chainring sprocket 34 can have any suitable size or shape to achieve a desired functionality. For example, the chainring sprocket 34 can be round or oval and can have various numbers of teeth. Optionally, the number of teeth can range from 24 to 36, and chainring sprockets having a different number of teeth are also within the scope of the present disclosure. The pedal crank 33 can be configured in a known manner to further include crank arms and a crank spindle which are rigidly connected to each other and the chainring sprocket 34. Furthermore, the free ends of the pedal crank 33 typically have pedals against which the feet of the rider apply force.

Still referring to FIG. 1, the drive chain 35 forms the mechanical linkage between the pedal crank 33, specifically the chainring sprocket 34, and a cassette 36 (or arrangement of rear sprockets) which is preferably provided on the rear wheel 28 for transmission of drive torque to the rear wheel 28. Thus, the drive chain 35 transmits pedaling actuation from the pedal crank 33 to the cassette 36. The drive chain 35 can be configured in a known manner as a roller chain having inner and outer plates that alternate in the chain running direction.

Figure 3:
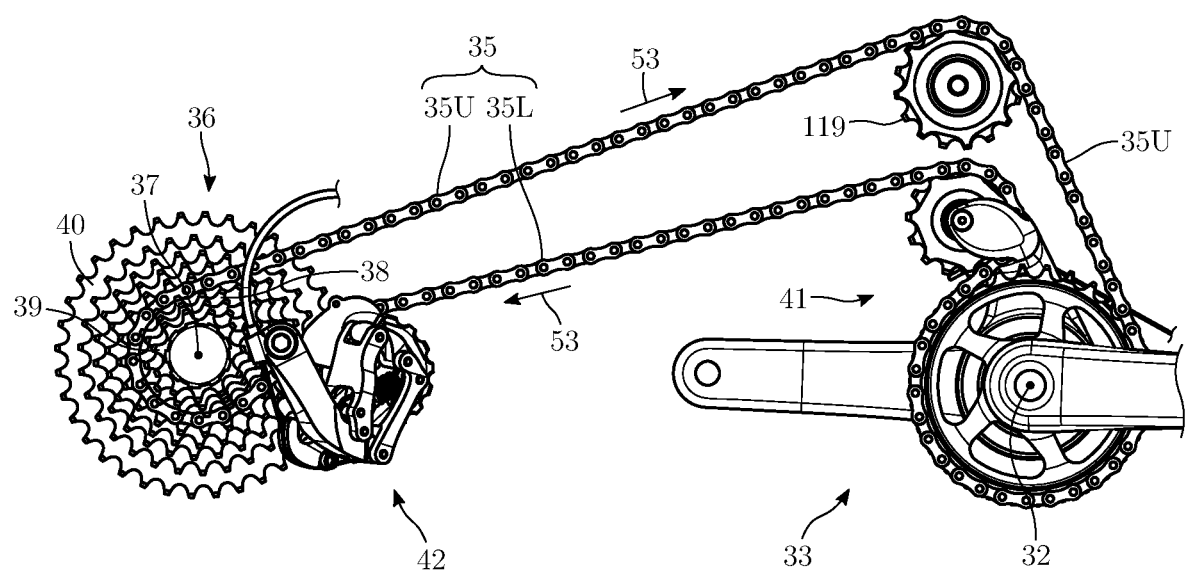
FIG. 3 is a side elevational view of the drivetrain in accordance with the first embodiment.

Reference is now made to FIG. 3, which is a side elevational view of the drivetrain 20. The cassette 36 is an arrangement of sprockets that are coaxial with reference to a cassette sprocket axis 37. The cassette sprocket axis 37 is orthogonal with respect to the plane of the drawing of FIG. 3. The sprocket selected to be active in FIG. 3 is identified with the reference symbol 38, the sprocket having the smallest diameter is identified with the reference symbol 39, and the sprocket having the largest diameter is identified with the reference symbol 40. In the example shown, the cassette 36 demonstrates nine sprockets, of which each individual one differs from all the other sprockets of the cassette 36 in terms of diameter and number of teeth. However, the number of sprockets of the cassette 36 can be different from nine; the cassette 36 can also comprise 8 or less sprockets, or 10, 11, 12, or more sprockets. In the example shown, the difference in the number of teeth between the smallest sprocket 39 and the largest sprocket 40 amounts to 25 teeth, although the difference in the number of teeth between the smallest sprocket 39 and the largest sprocket 40 can also be less than or greater than 25, such as 14, 31, 35, or 40. Other differences in the number of teeth between the smallest sprocket 39 and the largest sprocket 40 are also within the scope of the present disclosure.

For continued description of the drivetrain 20, it is helpful to distinguish between the drive chain upper portion 35U and the drive chain lower portion 35L. These are individually referenced in FIG. 3. The drive chain upper portion 35U is the portion of the drive chain 35 that is tensioned from pedaling forces, and the drive chain lower portion 35L is the portion of the drive chain 35 that is not tensioned from pedaling forces.

As shown in the figures, the drive chain lower portion 35L passes through a chain tensioner 41 and a rear derailleur 42 on its way from the pedal crank 33 to the cassette 36.

Rear Derailleur

According to the exemplary embodiment, as shown in FIG. 1 and FIG. 2, the rear derailleur 42 is provided on the rear frame portion 24 of the bicycle 21. The rear derailleur 42 is configured to control the shifting of gears of the bicycle 21 by selectively changing which sprocket of the cassette 36 is engaged with the drive chain 35.

Figure 4:
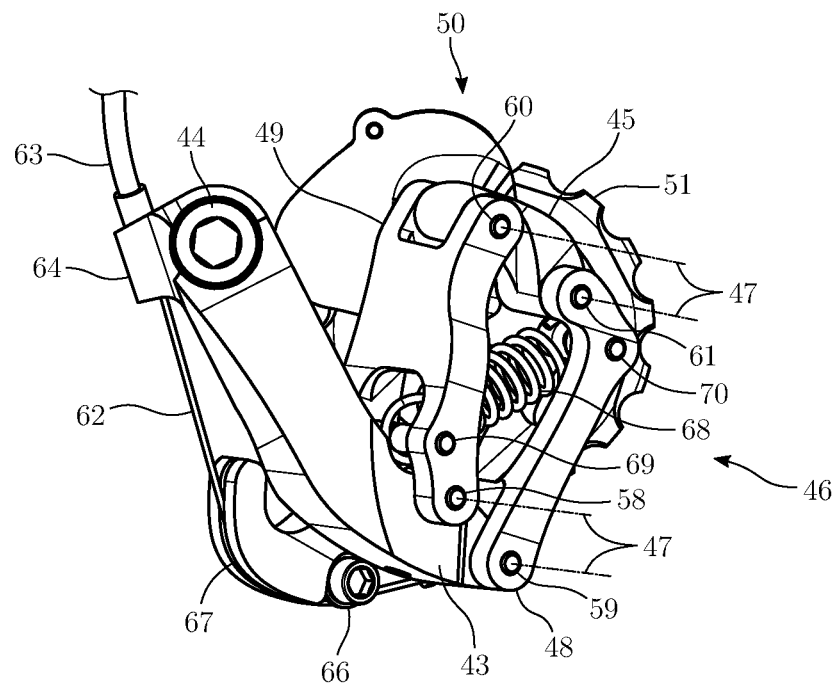
FIG. 4 is an enlarged side elevational view of the rear derailleur in accordance with the first embodiment.

FIG. 4 is an enlarged side elevational view of the rear derailleur 42 and is referenced as follows. The rear derailleur 42 includes a derailleur base member 43, which, in the exemplary embodiment, is attached to the frame 22 of the bicycle 21 with a mounting bolt 44. The derailleur base member 43 is made of aluminum alloy or any other suitable material for securely supporting the rear derailleur 42 with respect to its mounting point on the frame 22 of the bicycle 21. The rear derailleur 42 further includes a movable member 45, which is movable relative to the derailleur base member 43 in such a way that is made available by a parallelogram four-pivot articulation 46. The parallelogram four-pivot articulation 46 has four pivot axes identified with the reference symbol 47. A lower link arm 48 and an upper link arm 49 connect the derailleur base member 43 and the movable member 45, and are part of the parallelogram four-pivot articulation 46. The movable member 45, lower link arm 48, and upper link arm 49 are made of aluminum alloy, plastic, or any other suitable rigid material.

Figure 5:
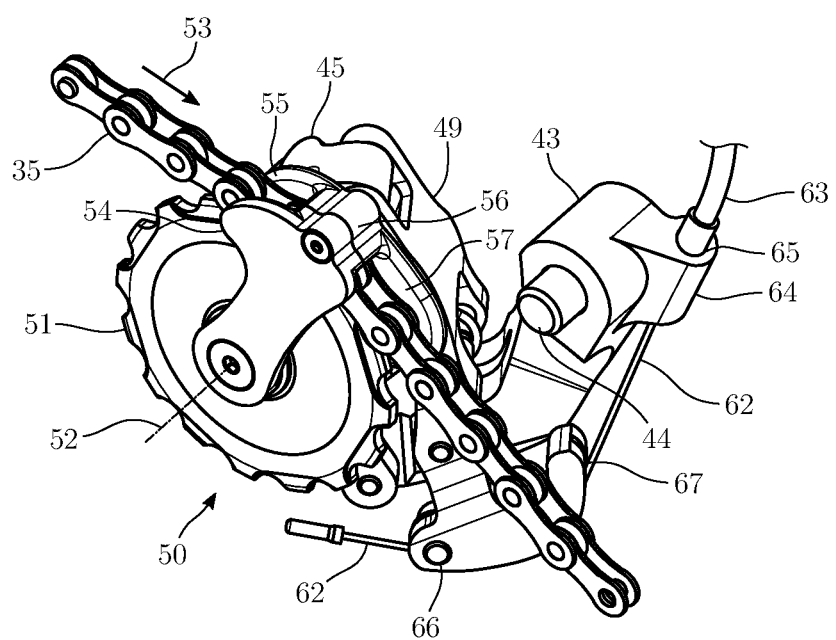
FIG. 5 is an enlarged isometric view of the rear derailleur from the back side in accordance with the first embodiment.

Reference is now made to FIG. 5, which is an enlarged isometric view of the rear derailleur 42 from the back side. A derailleur chain guide 50 is disposed on the movable member 45. The gears of the bicycle 21 are shifted by moving the derailleur chain guide 50 in a direction substantially parallel to the cassette sprocket axis 37. This movement allows the derailleur chain guide 50 to guide the drive chain 35 (as it is driven by the rider) out of engagement with one cassette 36 sprocket and into engagement with another cassette 36 sprocket that is aligned with the new orientation of the derailleur chain guide 50.

In the exemplary embodiment, the derailleur chain guide 50 comprises a guide pulley 51 having a guide pulley axis 52 that is essentially parallel to the cassette sprocket axis 37. The guide pulley 51 is in meshing engagement with the drive chain 35, and it is the last sprocket that the drive chain 35 runs off during movement in the drive direction according to arrow 53 before it reaches the selected active cassette 36 sprocket (for example, sprocket 38 in FIG. 3). The guide pulley 51 is made of acetal plastic or any other suitable material.

As shown in FIG. 5, the derailleur chain guide 50 further comprises a first guiding plate 54, a second guiding plate 55, and a bridge 56. The first guiding plate 54 has a first guiding surface. The second guiding plate 55 is closer to the movable member 45 than the first guiding plate 54 and has a second guiding surface facing the first guiding surface to define a chain guiding slot between the first guiding surface and the second guiding surface. The bridge 56 connects the first guiding plate 54 and the second guiding plate 55. Optionally, the bridge can be split with both sides connected by a screw, as shown in FIG. 5. The first guiding plate 54, the second guiding plate 55, and the bridge 56 are disposed generally above the guide pulley 51 so that the drive chain 35 that is engaged with the guide pulley 51 passes through the chain guiding slot. The first guiding plate 54, the second guiding plate 55, and the bridge 56 prevent derailment of the drive chain 35 from the guide pulley 51.

In the exemplary embodiment, the derailleur chain guide 50 further comprises a pusher plate 57 shown in FIG. 5. During gear shifts to larger cassette 36 sprockets, the pusher plate 57 contacts the outer side of the portion of drive chain 35 between the guide pulley 51 and the active cassette 36 sprocket. This serves to help push the drive chain 35 onto the larger sprocket (in conjunction with the guiding action of the guide pulley 51). The pusher plate 57 can also keep the drive chain 35 from over-shooting during gear shifts to smaller cassette 36 sprockets.

In the exemplary embodiment, the second guiding plate 55, the pusher plate 57, and a portion of the bridge 56 are integrally formed with the movable member 45.

Other configurations of the derailleur chain guide 50 for guiding the drive chain 35 are within the scope of the present disclosure. The guide pulley 51 is shown as a sprocket, although it can instead be a roller (i.e. without teeth). Also, there can be no guide pulley 51 (neither in the sprocket nor roller form), and the drive chain 35 can instead be guided by sliding surfaces that are fixed relative to the movable member 45.

Referring to FIG. 4 and FIG. 5, the guide pulley 51 is shown to have 16 teeth, although the number of teeth can be less than or greater than 16. However, it is advantageous for the number of teeth (or diameter) of the guide pulley 51 to be sufficient for there to be an adequate length of drive chain 35 engaged with the guide pulley 51; this is explained as follows. The guide pulley 51 of the rear derailleur 42 can have a small amount of angular chain wrap compared to the guide pulley of conventional rear derailleurs. The angular chain wrap of a pulley is the angle between two radial lines that intersect the pulley's points of engagement and disengagement with a chain. Angular chain wrap and the size of the guide pulley 51 determine the length of drive chain 35 engaged with the guide pulley 51. Increasing the size of the guide pulley 51 generally increases the length of drive chain 35 engaged with the guide pulley 51, and vice versa. To reduce noise and friction from movement of the drive chain 35 over the guide pulley 51 and to ensure that the guide pulley 51 can adequately guide the drive chain 35, the length of drive chain 35 engaged with the guide pulley 51 should not be excessively short. By extension, for a given amount of angular chain wrap, the guide pulley 51 should not have an excessively small number of teeth (or diameter).

As shown in FIG. 4, the parallelogram four-pivot articulation 46 operationally connects the movable member 45 (and derailleur chain guide 50) to the derailleur base member 43. The upper link arm 49 and lower link arm 48 are pivotally connected at one end to the derailleur base member 43 by a first pivot pin 58 and a second pivot pin 59, respectively. The first pivot pin 58 passes through coaxial apertures in the upper link arm 49 and the derailleur base member 43, and the second pivot pin 59 passes through coaxial apertures in the lower link arm 48 and the derailleur base member 43. The upper link arm 49 and lower link arm 48 are pivotally connected at another end to the movable member 45 by a third pivot pin 60 and a fourth pivot pin 61, respectively. The third pivot pin 60 passes through coaxial apertures in the upper link arm 49 and the movable member 45, and the fourth pivot pin 61 passes through coaxial apertures in the lower link arm 48 and the movable member 45.

The bicycle 21 preferably includes a shifter (not shown) via which the rear derailleur 42 is operated by the rider for changing which sprocket of the cassette 36 is engaged with the drive chain 35. The shifter is mounted preferably to a handlebar (not shown) of the bicycle 21 and can be mechanically, electrically, or wirelessly connected to the rear derailleur 42. In the exemplary embodiment depicted in FIG. 4 and FIG. 5, the shifter is mechanically connected to the rear derailleur 42 by a shift cable 62 (or Bowden cable or inner wire) that is slidably disposed within a shift cable housing 63 (or Bowden cable housing or outer casing).

In the exemplary embodiment, the derailleur base member 43 has a shift cable guide 64 which is integrally formed with the derailleur base member 43. The shift cable guide 64 could instead be a separate member attached to the derailleur base member 43 by a suitable fastener. Referring to FIG. 5, the shift cable guide 64 has a through bore 65 with a first section that is dimensioned for receiving an end portion of the shift cable housing 63 and a second section that is dimensioned for receiving the shift cable 62 therethrough. Thus, the first section has a larger diameter than the second section.

In the exemplary embodiment, the upper link arm 49 has a shift cable anchor 66 (or cable clamp), which includes a washer and a bolt that is screwed into a hole of the upper link arm 49. The shift cable 62 is entrained or spooled on a derailleur arcuate surface 67 (or arcuate channel or entrainment surface) that is substantially parallel to the plane of motion of the upper link arm 49 and that curves toward the shift cable anchor 66 on the upper link arm 49.

The derailleur chain guide 50 moves relative to the derailleur base member 43 in response to actuation of the shift cable 62. Thus, the derailleur chain guide 50 can be moved laterally by moving the parallelogram four-pivot articulation 46 via the shift cable 62. Referring to FIG. 4, pulling the shift cable 62 moves the derailleur chain guide 50 against the biasing force of a derailleur biasing element 68, while releasing the shift cable 62 causes the derailleur chain guide 50 to move due to the biasing force of the derailleur biasing element 68.

In the exemplary embodiment, the derailleur biasing element 68 is a helical extension spring which is mounted at one end about a first spring mount pin 69 and at the other end about a second spring mount pin 70. The first spring mount pin 69 is fixedly connected to the upper link arm 49, and the second spring mount pin 70 is fixedly connected to the lower link arm 48. The derailleur biasing element 68 biases the lower and upper link arms 48, 49 such that the movable member 45 is normally biased outwardly away from the bicycle 21 relative to the derailleur base member 43.

Alternatively to the configuration of the derailleur biasing element 68 described above, the derailleur biasing element 68 can be connected at one end about the first pivot pin 58 (at the pivot between the upper link arm 49 and the derailleur base member 43) and at the other end about the fourth pivot pin 61 (at the pivot between the lower link arm 48 and the movable member 45), or the derailleur biasing element 68 can be connected at one end about the first pivot pin 58 and at the other end about a spring mount pin that resembles the second spring mount pin 70 (i.e. that is eccentric to the parallelogram axes 47 and fixedly connected to the lower link arm 48). Other configurations of the derailleur biasing element 68 are within the scope of the present disclosure.

A high limit screw and a low limit screw (both not shown) are used in a known manner to adjust the range of motion of the parallelogram four-pivot articulation 46. The high limit screw limits the motion of the derailleur chain guide 50 so that it can be positioned no further away from the bicycle 21 than when in the highest gear. Accordingly, the low limit screw limits the motion of the derailleur chain guide 50 so that it can be positioned no further toward the bicycle 21 than when in the lowest gear. Turning the limit screws adjusts the limit of travel of the derailleur chain guide 50. Tightening the limit screws restricts the travel, while loosening the limit screws allows more travel. The purpose of adjusting the limit screws is to find the tightest high and low limit screw settings that will allow good shifts to the smallest sprocket 39 and largest sprocket 40 of the cassette 36, respectively.

Chain Tensioner

The chain tensioner 41 is configured for maintaining the drive chain 35 in a tensioned state or restoring a tensioned state after an antecedent state of insufficient tension. Due to the varying sizes of the cassette 36 sprockets and the varying positions of the guide pulley 51, the length of drive chain 35 to be recuperated by the chain tensioner 41 will vary when the gears of the bicycle 21 are changed. If the bicycle 21 includes a rear suspension system, the length of drive chain 35 to be recuperated by the chain tensioner 41 can vary when the rear suspension system is actuated. Also, the drive chain 35 slackens and tightens under rapid accelerations which occur when the bicycle 21 is ridden over uneven terrain. Thus, the chain tensioner 41 is provided to account for the varying lengths of drive chain 35 to be recuperated and to maintain the drive chain 35 in approximately constant tension.

Figure 6:
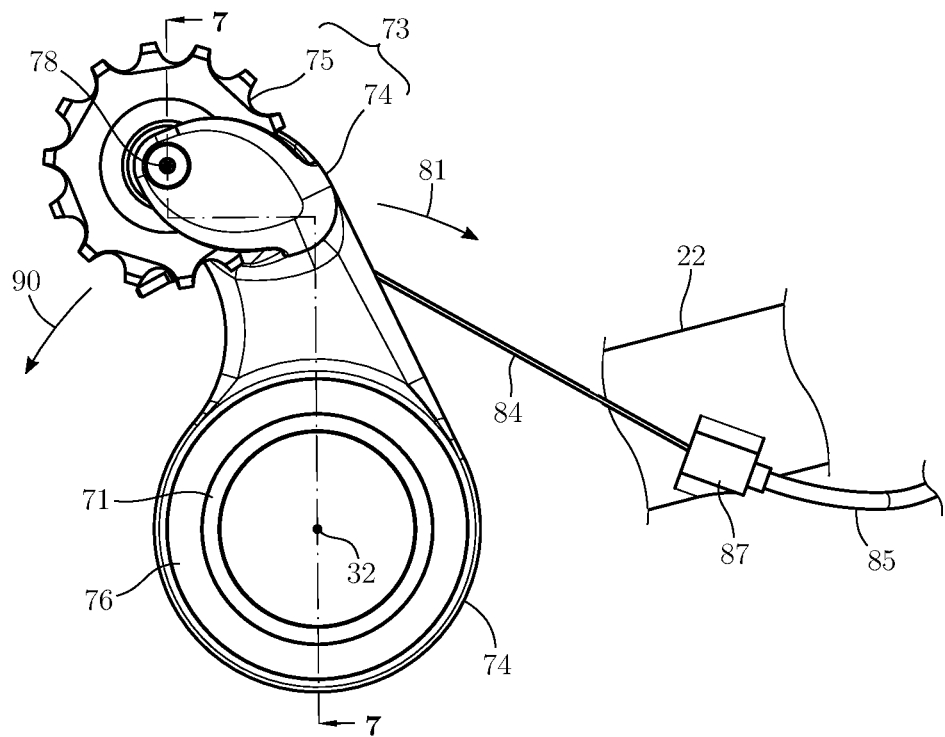
FIG. 6 is an enlarged side elevational view of part of the chain tensioner.
Figure 7:
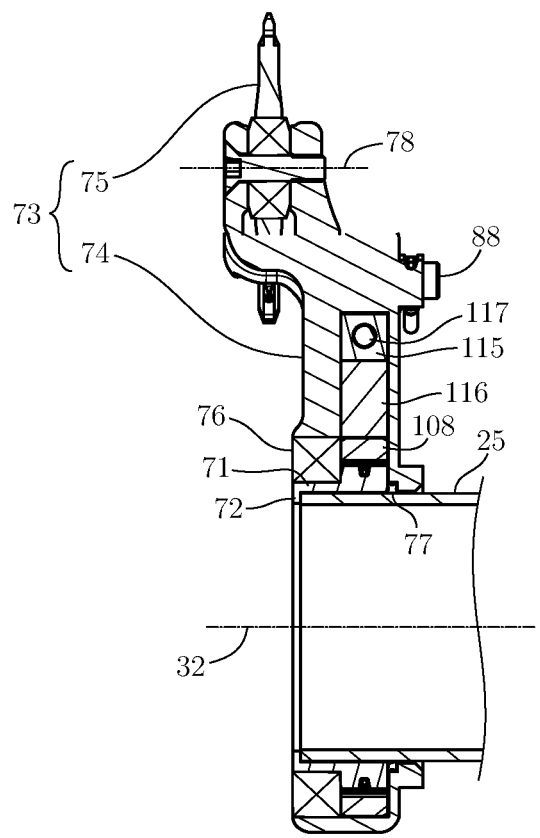
FIG. 7 is a sectional view of a portion of the bottom bracket shell and the part of the chain tensioner of FIG. 6 taken at the sectioning plane and in the direction indicated by section lines 7-7, in accordance with the first embodiment.

FIG. 6 is an enlarged side elevational view of part of the chain tensioner 41, and FIG. 7 is a sectional view of a portion of the bottom bracket shell 25 and the part of the chain tensioner 41 of FIG. 6 taken at the sectioning plane and in the direction indicated by section lines 7-7. Both FIG. 6 and FIG. 7 are referenced as follows. According to the exemplary embodiment, the chain tensioner 41 includes a tensioner base member 71 that is attached to the bottom bracket shell 25 of the bicycle 21. The tensioner base member 71 has a flange 72 that is axially compressed between the bottom bracket shell 25 and a bottom bracket (not shown) that threads into the bottom bracket shell 25. However, other configurations for attaching the tensioner base member 71 to the bottom bracket shell 25 are within the scope of the present disclosure.

Still referring to FIG. 6 and FIG. 7, the chain tensioner 41 includes a tensioner chain guide 73 which itself includes a tensioner chain guide body 74 and, in the exemplary embodiment, a tension pulley 75. The tensioner chain guide 73 can be regarded as a tensioner arm or member with chain guiding components. In the exemplary embodiment, the tensioner chain guide 73 is rotatably mounted to the tensioner base member 71 for rotation around an axis that is substantially coaxial with the bottom bracket shell axis 32. However, the tensioner chain guide 73 can be configured for moving in any other way for accomplishing a desired functionality. Also, the tensioner base member 71 can be attached elsewhere on the bicycle 21 than the bottom bracket shell 25. Other exemplary embodiments of the tensioner chain guide 73 are described later in the present disclosure. Furthermore, the tensioner base member 71 and the tensioner chain guide body 74 are made of aluminum alloy, plastic, or any other suitable material.

The tensioner chain guide 73 is supported by a tensioner bearing 76 so that it can rotate with respect to the stationary bottom bracket shell 25. In the exemplary embodiment, the tensioner bearing 76 is a sealed radial ball bearing; however, the tensioner bearing 76 can also be a bushing (i.e. plain bearing) or any other suitable type of bearing. On the side of the chain tensioner 41 axially opposite to the tensioner bearing 76, an elastic seal 77 made of rubber is disposed in a recess in the inner circumference of the chain tensioner 41. The elastic seal 77 is in axially sealing engagement between the tensioner chain guide 73 and the tensioner base member 71, with the tensioner chain guide 73 able to rotate relative to the tensioner base member 71. The elastic seal 77 can be an X-profile O-ring, a wiper seal, or any other type of seal for accomplishing a desired functionality.

As shown in FIG. 6, the tension pulley 75 of the tensioner chain guide 73 has a tension pulley axis 78 that is essentially parallel to the cassette sprocket axis 37. The tension pulley axis 78 is orthogonal with respect to the plane of the drawing of FIG. 6. The tension pulley 75 is in meshing engagement with the drive chain 35 and, as seen in FIG. 3, it is the last thing the drive chain 35 runs off during movement in the drive direction of rotation 53 before it reaches the guide pulley 51. The tension pulley 75 is made of acetal plastic or any other suitable material.

Other configurations of the tensioner chain guide 73 for guiding the drive chain 35 are within the scope of the present disclosure. In the example shown, the tension pulley 75 has 14 teeth, but the number of teeth of the tension pulley 75 can be different from 14. The tension pulley 75 is shown as a sprocket, although it can instead be a roller. Also, there can be no tension pulley 75 (neither in the sprocket nor roller form), and the drive chain 35 can instead be guided by sliding surfaces that are fixed relative to the tensioner chain guide body 74.

Figure 8:
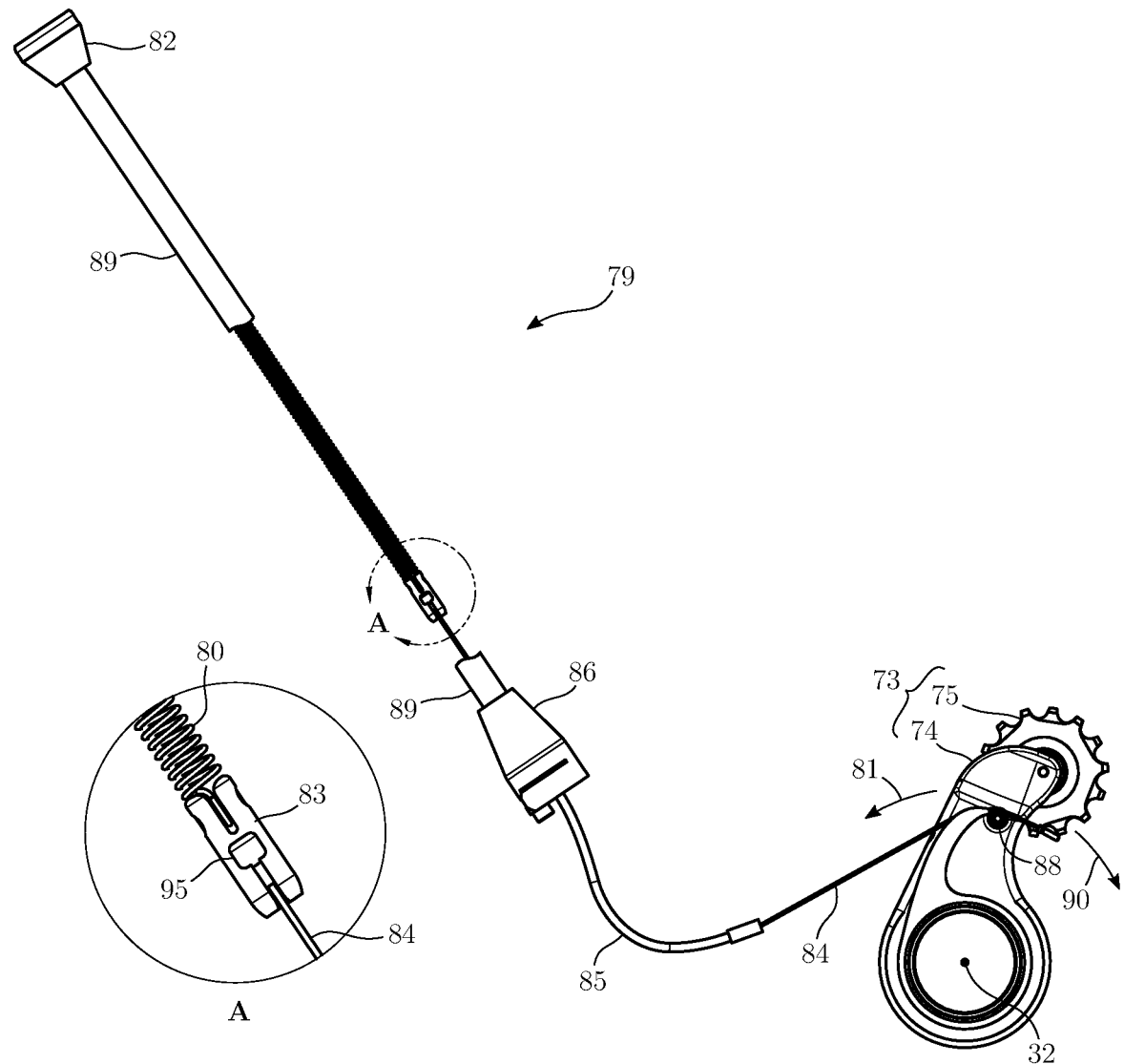
FIG. 8 is a side elevational view from the back side of the chain tensioner, including its biasing assembly, with the guiding tube broken for showing the components within, and with an enlarged view of the movable spring mount, in accordance with the first embodiment.

Reference is now made to FIG. 8, which is a side elevational view of the chain tensioner 41 from the back side, showing both the part of the chain tensioner 41 of FIG. 6 and a biasing assembly 79. The biasing assembly 79 is located inside and is coaxial to the down tube 26 of the frame 22 (the down tube 26 is not shown in FIG. 8). The biasing assembly 79 includes a tensioner biasing element 80 that is configured to actuate the tensioner chain guide 73 for producing tension on the drive chain 35. In the exemplary embodiment, the tensioner biasing element 80 creates a torque on the tensioner chain guide 73 in the chain tensioning direction 81 (i.e. in a clockwise direction when viewed laterally outwardly from the drivetrain 20 or in a counter-clockwise direction when viewed as in FIG. 8).

In the exemplary embodiment, the tensioner biasing element 80 is a helical extension spring attached at its first end to a fixed spring mount 82 and at its second end to a movable spring mount 83. The fixed spring mount 82 is fixed relative to the frame 22 of the bicycle 21. The end of a tensioner cable 84 is fixed to the movable spring mount 83 coaxially to the tensioner biasing element 80. This tensioner cable 84 is a Bowden-type cable that is slidably disposed within a tensioner cable housing 85. The tensioner cable housing 85 is supported at its first end to an expansion collar 86, which is fixed relative to the frame 22, and at its second end to a housing stop 87 (or cable guide; shown in FIG. 6), which is also fixed relative to the frame 22. The second end of the tensioner cable 84 is anchored to the tensioner chain guide body 74 by a tensioner cable anchor 88, which includes a washer and a bolt that is screwed into a hole of the tensioner chain guide body 74. The expansion collar 86 supports a guiding tube 89 in which the tensioner biasing element 80 and the movable spring mount 83 are coaxially guided. The guiding tube 89, in turn, axially supports the fixed spring mount 82.

The biasing assembly 79 is configured such that the rotational direction of the tensioner chain guide 73 corresponding to the chain slackening direction 90 is the rotational direction in which the tensioner biasing element 80 is extended. Rotation of the tensioner chain guide 73 produces linear motion of the movable spring mount 83 by means of the tensioner cable 84, and linear motion of the movable spring mount 83 actuates the tensioner biasing element 80.

In the example shown, the tensioner biasing element 80, expansion collar 86, guiding tube 89, fixed spring mount 82, and movable spring mount 83 (collectively, the biasing assembly 79) are located coaxially inside the down tube 26 of the frame 22. However, these components can be located elsewhere on the bicycle 21.

Figure 9:
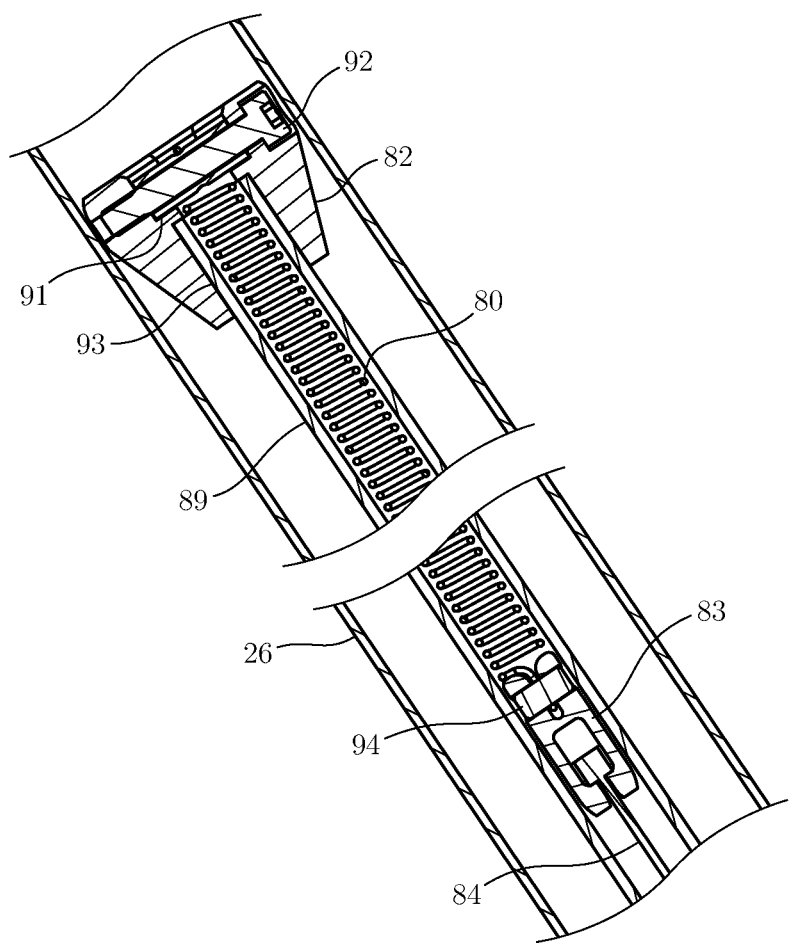
FIG. 9 is a sectional view of both the fixed spring mount and the movable spring mount of FIG. 8 taken at the center plane of the bicycle and from the same viewing direction as FIG. 8, in accordance with the first embodiment.

FIG. 9 is a sectional view of both the fixed spring mount 82 and the movable spring mount 83 of FIG. 8 taken at the center plane of the bicycle 21 and from the same viewing direction as FIG. 8. As can be seen in the upper left side of FIG. 9, a spring mount sleeve 91 supports the fixed end of the tensioner biasing element 80. This spring mount sleeve 91 has a coaxial groove on the middle of its outer cylindrical surface for receiving the fixed end of the tensioner biasing element 80 to keep the tensioner biasing element 80 centered with respect to the guiding tube 89. The spring mount sleeve 91 is connected to the fixed spring mount 82 by a spring mount bolt 92. The fixed spring mount 82 has a through bore with a section 93 that is dimensioned for receiving an end portion of the guiding tube 89. The fixed spring mount 82 is axially supported by the guiding tube 89 and radially supported by the down tube 26. There is a small gap between the outmost portion of the fixed spring mount 82 and the inner surface of the down tube 26 to allow for the fixed spring mount 82 to slide into the down tube 26 during installation. This gap is small to avoid excessive movement of the fixed spring mount 82 when the bicycle 21 is being ridden. The fixed spring mount 82, the spring mount sleeve 91, and the guiding tube 89 are made of plastic or any other suitable material.

The movable spring mount 83 is shown in the lower right side of FIG. 9. A spring mount pin 94 supports the movable end of the tensioner biasing element 80 and is fixed to the movable spring mount 83. The spring mount pin 94 therefore moves with the movable spring mount 83 along the inside of the guiding tube 89 when the tensioner biasing element 80 is retracted or extended due to actuation of the tensioner cable 84. The spring mount pin 94 is made of metal or any other suitable material, and the movable spring mount 83 is made of plastic or any other suitable material. In the example shown, the tensioner cable 84 has an enlarged cylindrical end (or cable head), and this end of the tensioner cable 84 is assembled into the movable spring mount 83 by insertion into a slotted opening 95 of the movable spring mount 83, which can be seen in FIG. 8.

Figure 10:
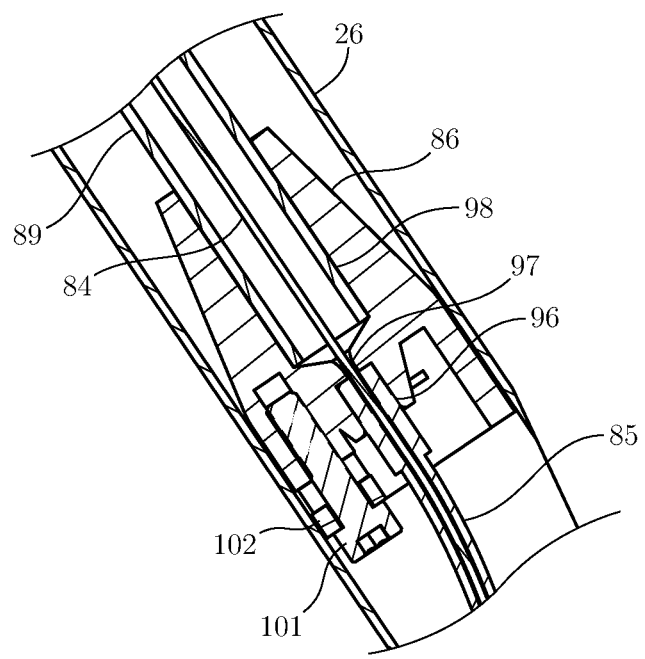
FIG. 10 is a sectional view of the expansion collar of FIG. 8 taken at the center plane of the bicycle and from the same viewing direction as FIG. 8, in accordance with the first embodiment.

FIG. 10 is a sectional view of the expansion collar 86 of FIG. 8 taken at the center plane of the bicycle 21 and from the same viewing direction as FIG. 8. FIG. 10 can be considered an extension from the lower right side of FIG. 9. The expansion collar 86 has a through bore with a first section 96 that is dimensioned for receiving an end portion of the tensioner cable housing 85, a second section 97 that is dimensioned for receiving the tensioner cable 84 therethrough, and a third section 98 that is dimensioned for receiving an end portion of the guiding tube 89. The guiding tube 89 is axially supported by the expansion collar 86. The force imparted by the tensioner biasing element 80 on the fixed spring mount 82 axially compresses the guiding tube 89 between the fixed spring mount 82 and the expansion collar 86. The guiding tube 89 can be pressed into the expansion collar 86 with an interference fit so that it is supported not only axially but also radially by the expansion collar 86.

Figure 11:
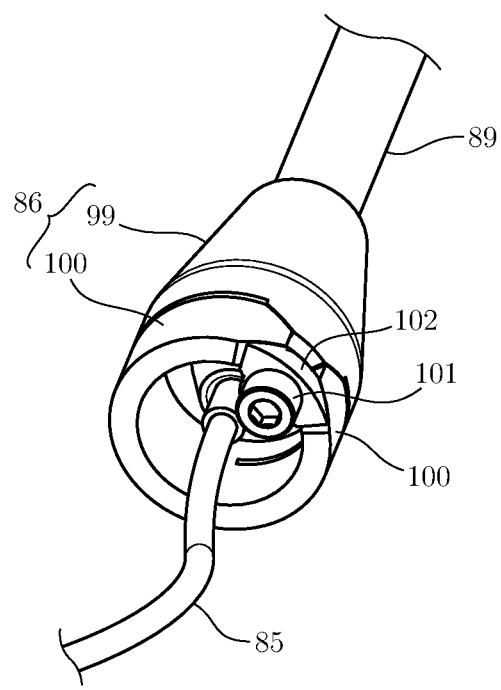
FIG. 11 is an isometric view of the expansion collar in accordance with the first embodiment.

Reference is now made to FIG. 11, which is an isometric view of the expansion collar 86. The expansion collar 86 includes both an expansion collar body 99 and expansion collar tongues 100. The expansion collar tongues 100 engage with the inside of the down tube 26 to fix the expansion collar 86 with respect to the down tube 26. A collar bolt 101 is in threading engagement with the expansion collar body 99. The body of the collar bolt 101 passes through a hole in a wedge 102 with a larger diameter than the body of the collar bolt 101 (i.e. there is no interference or threading engagement). The bearing surface of the head of the collar bolt 101 is axially biased against the wedge 102. Threading the collar bolt 101 into the expansion collar body 99 causes the wedge 102 to move along the axis of the collar bolt 101 toward the expansion collar body 99. Due to the angled ramps on the wedge 102, the expansion collar body 99, and the expansion collar tongues 100, this motion of the wedge 102 toward the expansion collar body 99 causes the expansion collar tongues 100 to be flexed outward and to grab the inside of the down tube 26. Threading the collar bolt 101 out of the expansion collar body 99 reduces the outward flexing of the expansion collar tongues 100 to release the inside of the down tube 26, thus allowing the expansion collar 86 to be removed from (or inserted into) the down tube 26. The expansion collar 86 and the wedge 102 are made of plastic or any other suitable material.

Figure 12:
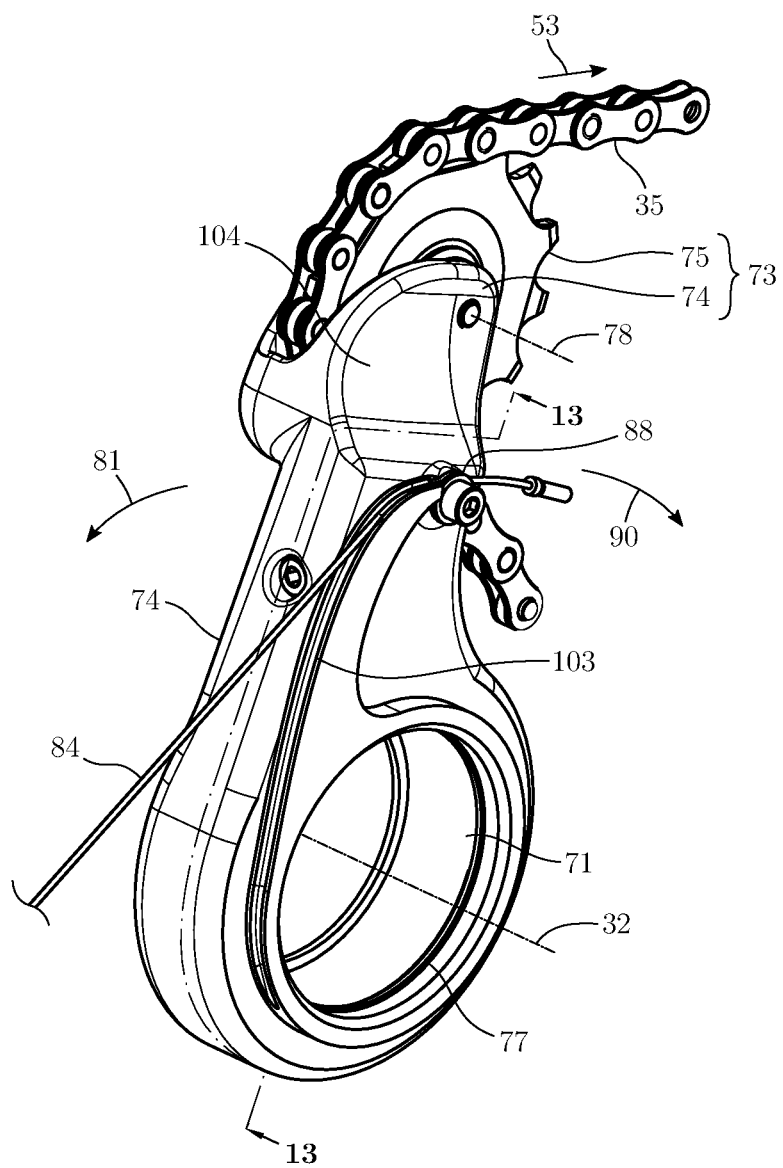
FIG. 12 is an isometric view of the back side of part of the chain tensioner in accordance with the first embodiment.

FIG. 12 is an isometric view of the back side of part of the chain tensioner 41 and is referenced as follows. The tensioner cable 84 is entrained or spooled on a tensioner arcuate surface 103 (or arcuate channel or entrainment surface) that is parallel to the plane of motion of the tensioner chain guide 73 and that curves toward the tensioner cable anchor 88. The tensioner arcuate surface 103 is integral with the tensioner chain guide body 74. A length of the tensioner cable 84 that is proximate to its affixed end conforms to the tensioner arcuate surface 103. The torque that the tensioner biasing element 80 produces on the tensioner chain guide 73 depends on the perpendicular distance (i.e. lever length) between the axis of rotation of the tensioner chain guide 73 and the portion of the tensioner cable 84 extending from the tensioner arcuate surface 103. In the exemplary embodiment, this lever length decreases by approximately half throughout the operational range of motion of the tensioner chain guide 73 in the chain slackening direction 90. A decrease in lever length corresponds to a decrease in mechanical advantage of the tensioner biasing element 80 on the tensioner chain guide 73. This decrease in mechanical advantage counters the increasing amount of restoring force produced by the tensioner biasing element 80 on the tensioner cable 84 when the tensioner chain guide 73 rotates in the chain slackening direction 90.

The tension in the drive chain lower portion 35L depends on the torque produced by the tensioner biasing element 80 on the tensioner chain guide 73. Therefore, the aforementioned decrease in lever length can be used to decrease variation in the tension of the drive chain lower portion 35L throughout the operational range of motion of the tensioner chain guide 73. This is advantageous because the friction, noise, and gear shifting performance of the drivetrain 20 can depend on the tension in the drive chain lower portion 35L.

It can be advantageous for the drive chain lower portion 35L to have substantially constant tension throughout the operational range of motion of the tensioner chain guide 73. For this to be achieved, the torque produced by the tensioner biasing element 80 on the tensioner chain guide 73 may have to decrease throughout the operational range of motion of the tensioner chain guide 73 in the chain slackening direction 90. This possible requirement arises due to the varying angles at which the drive chain lower portion 35L leaves the tension pulley 75. In the exemplary embodiment, the decrease in torque is achieved by having the aforementioned lever length decrease sufficiently quickly so that its mathematical product with the force from the tensioner biasing element 80 (i.e. torque) decreases throughout the operational range of motion of the tensioner chain guide 73 in the chain slackening direction 90. This degree of decrease in lever length is generally achieved in the exemplary embodiment shown in the figures, but it is not necessary for successful operation of the drivetrain 20.

Referring to FIG. 12, the portion of the tensioner chain guide 73 that is indicated by the reference symbol 104 is recessed for clearance with the rear tire when the tensioner chain guide 73 is rotated in the chain slackening direction 90. The need for this feature depends on the width of the rear tire, among other possible factors.

Referring to FIG. 6, the housing stop 87 has a through bore with a first section that is dimensioned for receiving an end portion of the tensioner cable housing 85 and a second section that is dimensioned for receiving the tensioner cable 84 therethrough. For reducing wear and friction, the inner periphery of the housing stop 87 that can contact the tensioner cable 84 may be made of a metallic material or another suitable material such as hard resin. In the example shown, the housing stop 87 is integral with the frame 22. Alternatively, the housing stop 87 can be part of a component that clamps onto the frame 22 or that is fastened to the frame 22.

Figure 13:
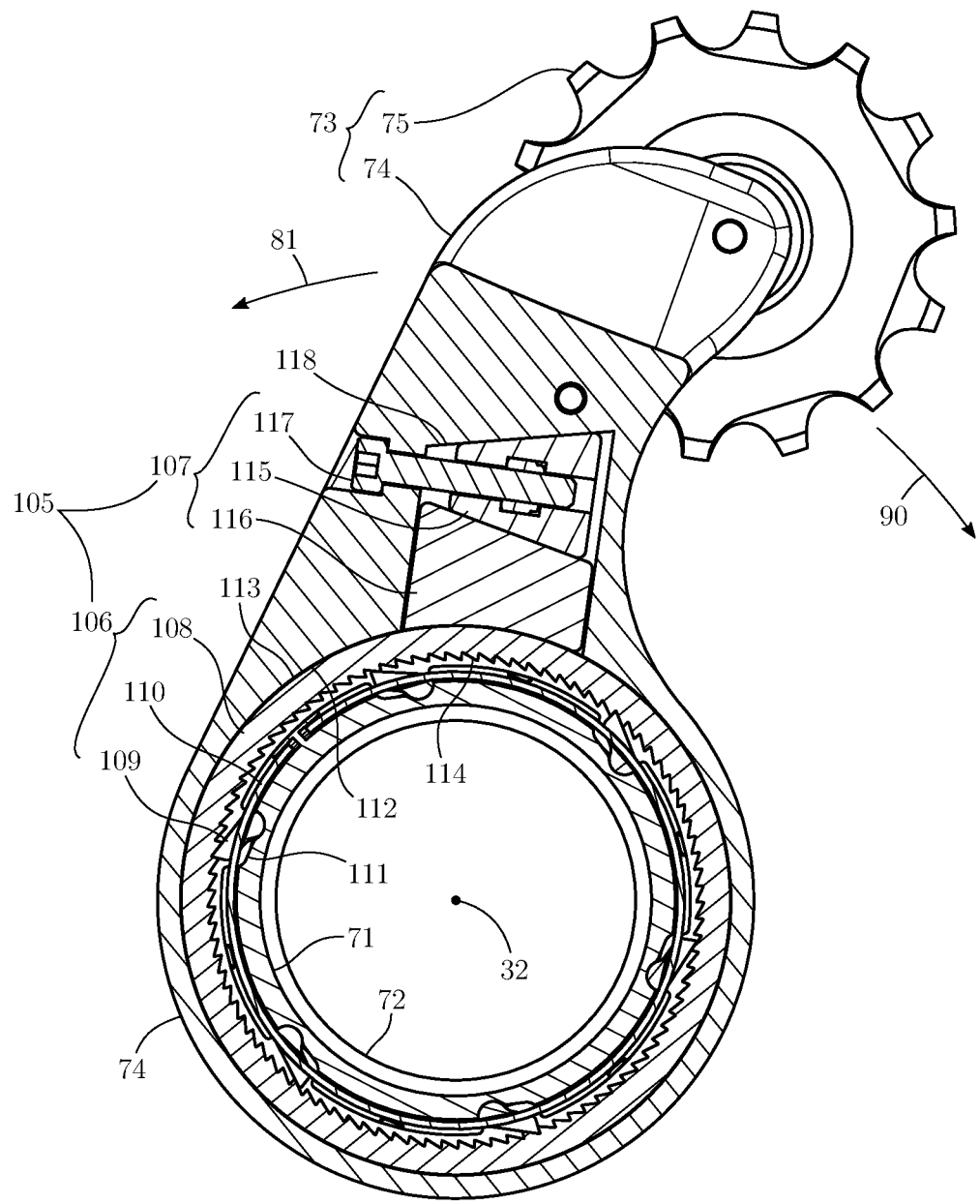
FIG. 13 is a sectional view of the part of the chain tensioner of FIG. 12 taken at the sectioning plane and in the direction indicated by section lines 13-13, in accordance with the first embodiment.

Reference is now made to FIG. 13, which is a sectional view of the part of the chain tensioner 41 of FIG. 12 taken at the sectioning plane and in the direction indicated by section lines 13-13. In the exemplary embodiment, the chain tensioner 41 includes a damper 105 for damping the rotational movement of the tensioner chain guide 73 relative to the tensioner base member 71 in the chain slackening direction 90 opposite to the chain tensioning direction 81. The damper 105 applies a damping force to the tensioner chain guide 73 which opposes its rotation in the chain slackening direction 90. In the exemplary embodiment, the damper 105 includes a one-way clutch assembly 106 and a friction assembly 107.

The one-way clutch assembly 106 includes a ratchet ring 108, one or more pawls 109, and an elastic member 110. The pawls 109 sit in slots 111 of the tensioner base member 71 and act between the tensioner base member 71 and the ratchet ring 108. The elastic member 110 provides a return force to the pawls 109. The ratchet ring 108 has a ratchet ring frictional portion 112 on the outside thereof which is in frictional engagement with a chain guide frictional portion 113 of the tensioner chain guide body 74. The ratchet ring 108 has multiple ratchet teeth 114 defined in its inner periphery. The pawls 109 engage with the ratchet teeth 114. The pawls 109 may be made of hardened steel or any other suitable material, and the ratchet ring 108 may be made of metal or plastic or any other suitable material.

The one-way clutch assembly 106 is configured such that the rotational direction of the tensioner chain guide 73 corresponding to the chain tensioning direction 81 is the rotational direction of the one-way clutch assembly 106 in which the tensioner chain guide 73 may rotate freely with respect to the tensioner base member 71; in this rotational direction, the ratchet ring 108 is entrained with the tensioner chain guide body 74 for common rotation. The chain slackening direction 90 being opposite to the chain tensioning direction 81 corresponds to the locking direction of the one-way clutch assembly 106 in which the ratchet ring 108 is locked with respect to the tensioner base member 71.

In the example shown, the one-way clutch assembly 106 has six pawls 109; however, the number of pawls 109 can be different than six. Also, in the example shown, the ratchet ring 108 has 93 ratchet teeth 114, but the number of ratchet teeth 114 can be different than 93.

In the exemplary embodiment, not all the pawls 109 engage with the ratchet teeth 114 at the same time. Rather, the pawls 109 take turns engaging with the ratchet teeth 114. More specifically, in the example shown, there are two groups of three pawls 109, and only one group of three pawls 109 is engaged with the ratchet teeth 114 at a time (this is illustrated in FIG. 13, in which three of the six pawls are shown to be engaged with the ratchet teeth 114). Compared to having all pawls 109 engage with the ratchet ring 108 at the same time, this increases the precision of the rotary engagement of the one-way clutch assembly 106 by a factor of 2 (i.e. from 360°/93=3.87° to 360°/93/2=1.94°). The one-way clutch assembly 106 could also be configured, for example, so that only one pawl 109 is engaged with the ratchet teeth 114 at a time, resulting in an increase in the precision of the rotary engagement of the one-way clutch assembly 106 by a factor of 6.

In the exemplary embodiment shown in FIG. 13, the friction assembly 107 includes a wedge member 115, a movable friction member 116, and a wedge bolt 117. The wedge member 115 and the movable friction member 116 are disposed in a cavity 118 of the tensioner chain guide body 74. The wedge member 115 biases the movable friction member 116 against the ratchet ring frictional portion 112 to produce a radially inwardly directed pressure on the ratchet ring 108. The wedge member 115 and the movable friction member 116 may be made of plastic or metal or any other suitable material.

The body of the wedge bolt 117 passes through a hole in the tensioner chain guide body 74 with a larger diameter than the body of the wedge bolt 117 (i.e. there is no interference or threading engagement). The bearing surface of the head of the wedge bolt 117 is axially biased against the tensioner chain guide body 74, and the wedge bolt 117 is in threading engagement with the wedge member 115. When the wedge bolt 117 is rotated about its axis in a first direction, the wedge member 115 is moved along the axis of the wedge bolt 117 relative to the tensioner chain guide body 74 to increase the biasing of the movable friction member 116 against the ratchet ring frictional portion 112. This also increases the pressure between the ratchet ring frictional portion 112 and the chain guide frictional portion 113. When the wedge bolt 117 is rotated about its axis in a second direction, the wedge member 115 is moved along the axis of the wedge bolt 117 relative to the tensioner chain guide body 74 to decrease the biasing of the movable friction member 116 against the ratchet ring frictional portion 112. Therefore, the friction assembly 107 allows for adjustment of the amount of radially inwardly directed pressure on the ratchet ring 108.

The operation of the damper 105 is as follows. When the tensioner chain guide 73 rotates in the chain slackening direction 90 opposite to the chain tensioning direction 81 (the chain slackening direction 90 is clockwise in FIG. 13), the ratchet ring 108 is fixed with respect to the tensioner base member 71. Because the movable friction member 116 of the friction assembly 107 exerts a radially inwardly directed force on the ratchet ring 108, frictional forces between the ratchet ring 108 and both the movable friction member 116 and the tensioner chain guide body 74 urge the ratchet ring 108 to rotate with the tensioner chain guide 73. However, rotation of the ratchet ring 108 is prevented by the pawls 109 which engage with the ratchet teeth 114, as shown in FIG. 13. Therefore, when the tensioner chain guide 73 rotates in the chain slackening direction 90, the ratchet ring 108 is fixed relative to the tensioner base member 71 and energy is dissipated to overcome the frictional forces. In this way, the rotation of the tensioner chain guide 73 in the chain slackening direction 90 is dampened by a frictional counter force which acts against this rotation of the tensioner chain guide 73.

Idler Pulley

The drive chain upper portion 35U passes over a chain guiding element on its way from the pedal crank 33 to the cassette 36. As shown in FIG. 3, the chain guiding element is an idler pulley 119 in the exemplary embodiment. The idler pulley 119 is rotatably mounted to the bicycle 21 for rotation about its axis, which is substantially parallel to the bottom bracket shell axis 32. In FIG. 1, the idler pulley 119 is shown to be mounted to the rear frame portion 24; however, the idler pulley 119 can be mounted elsewhere on the bicycle 21, such as the front frame portion 23 or any other part of the bicycle 21.

Other configurations of the idler pulley 119 are within the scope of the present disclosure. In the example shown, the idler pulley 119 has 16 teeth; however, the number of teeth of the idler pulley 119 can be different from 16. Also, the idler pulley 119 is shown as a sprocket, although it can instead be a roller, and the roller can have flanges for preventing disengagement of the drive chain 35 with the roller.

For embodiments in which the bicycle 21 includes a rear suspension system, the mounting location of the idler pulley 119 can be selected in conjunction with other frame design details, such as the location of suspension or linkage pivots, for optimizing the pedaling, braking, and bump absorption performance of the bicycle 21, in addition to other possible performance characteristics. In the exemplary embodiment, which includes a single-pivot rear suspension system, the idler pulley 119 is eccentric to the suspension pivot 30. This makes the idler pulley 119 follow a predetermined path as a function of suspension travel, and this affects the dynamic behavior of the bicycle 21 under pedaling power in addition to affecting other possible performance characteristics.

In the exemplary embodiment, the idler pulley 119, guide pulley 51, tension pulley 75, and chainring sprocket 34 are shown as having alternating tooth widths ("narrow-wide" tooth shape), which improves drive chain 35 retention. The concept of alternating tooth widths is conventional and thus will not be discussed in further detail. Optionally, any of the sprockets of the drivetrain 20 can have substantially constant tooth widths or any other sprocket tooth geometry.

Operation of the Drivetrain

Figure 14:
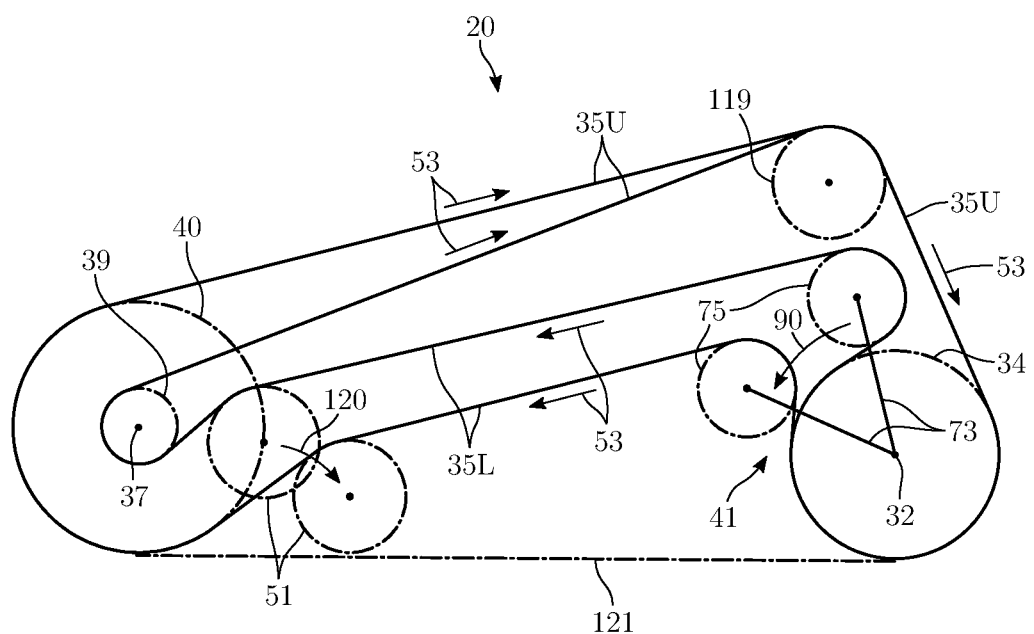
FIG. 14 is a side elevational schematic functional view of the drivetrain in high and low gear configurations, depicting chain paths and the motion of the derailleur chain guide and the motion of the tensioner chain guide between said gear configurations, in accordance with the first embodiment.

For the following description of functional configurations of the drivetrain 20 according to the exemplary embodiment, reference is made to FIG. 14, which is a right elevational schematic functional view of the drivetrain 20. FIG. 14 shows drive chain 35 paths for two configurations of the drivetrain 20: (1) with the drive chain 35 engaged with the smallest sprocket 39 of the cassette 36, and (2) with the drive chain 35 engaged with the largest sprocket 40 of the cassette 36. The total length of the drive chain 35 path is the same for both configurations. Therefore, FIG. 14 shows the change in drive chain 35 path when the engaged cassette 36 sprocket is changed from the smallest sprocket 39 to the largest sprocket 40.

The general direction of movement of the derailleur chain guide 50 (which, in the exemplary embodiment, includes the guide pulley 51) is shown with the arrow 120 for gear shifts to larger cassette 36 sprockets. The exact path of the derailleur chain guide 50 is determined by the geometry of the rear derailleur 42 and of its parallelogram four-pivot articulation 46. In the configuration with the drive chain 35 engaged with the smallest sprocket 39, the guide pulley 51 is approximately in the plane of the smallest sprocket 39. Accordingly, in the configuration with the drive chain 35 engaged with the largest sprocket 40, the guide pulley 51 is approximately in the plane of the largest sprocket 40.

The tensioner chain guide 73 rotates around the bottom bracket shell axis 32 in the direction shown with the arrow 90 in correspondence with gear shifts to larger cassette 36 sprockets. This rotational direction is opposite to the biasing of the tensioner biasing element 80.

The configuration of the drivetrain 20 with the drive chain 35 engaged with the smallest sprocket 39 corresponds essentially to the longest drive chain 35 length to be recuperated by the chain tensioner 41, since the smallest sprocket 39 corresponds to the shortest peripheral length among the available sprockets of the cassette 36. Accordingly, the configuration of the drivetrain 20 with the drive chain 35 engaged with the largest sprocket 40 corresponds essentially to the shortest drive chain 35 length to be recuperated by the chain tensioner 41, since the largest sprocket 40 corresponds to the longest peripheral length among the available sprockets of the cassette 36.

In addition to the size of the active cassette 36 sprocket, the position of the guide pulley 51 for a given gear is also a factor in determining the amount of drive chain 35 length to be recuperated by the chain tensioner 41. For example, for both configurations of the drivetrain 20 shown in FIG. 14, and assuming the same drive chain 35 length, if the guide pulley 51 were to be raised, a smaller length of chain would be recuperated by the chain tensioner 41; in other words, the tensioner chain guide 73 would be rotated counter-clockwise relative to what is shown in FIG. 14. The opposite is true if the guide pulley 51 were to be lowered.

The idler pulley 119 increases the possible range of motion of the tensioner chain guide 73 for removal of drive chain 35 slack relative to a drivetrain that is similar to or the same as the drivetrain 20 except without an idler pulley 119. This means that the tensioner chain guide 73 would be restricted to a significantly smaller range of angular motion if the upper portion of the drive chain 35U was routed directly from the chainring sprocket 34 to the cassette 36. The amount of range of motion of the tensioner chain guide 73 that can be enabled by the idler pulley 119 depends on the idler pulley's 119 size and position, among other possible factors.

One of the distinctive features of the drivetrain 20 is the elevated position of the drive chain lower portion 35L relative to that of drivetrains with conventional rear derailleurs. The drive chain lower portion 35L is generally located above a clearance line 121 depicted in FIG. 14. This clearance line 121 is defined as being parallel to and extended along the bottom of a portion of chain that is of the same construction as the drive chain 35 and that extends between and engages with the bottom of the chainring sprocket 34 and the bottom of the largest sprocket 40 of the cassette 36. The clearance line 121 is disposed below this portion of chain. However, it's possible for part of the drive chain 35 to be located below the clearance line 121 during moments, for example, when the bicycle 21 is ridden over uneven terrain or in any other scenario when the bicycle 21 is subject to rapid accelerations. Therefore, it is said that the drive chain 35 is only generally located above the clearance line 121. The intent of this discussion regarding the clearance line 121 is to convey the attribute of an elevated position of the drive chain lower portion 35L.

Further to previous description of the effect of the size of the guide pulley 51 on the length of drive chain 35 engaged with the guide pulley 51, additional factors that affect the length of drive chain 35 engaged with the guide pulley 51 are the position and size of the tension pulley 75 and the position and size of the cassette 36 sprocket that is engaged with the drive chain 35 (i.e. the active cassette 36 sprocket). As shown in FIG. 14, the position of the tension pulley 75 depends on which of the available cassette 36 sprockets is engaged with the drive chain 35 (among other possible factors). Therefore, when designing the rear derailleur 42 to have a certain length of drive chain 35 engaged with the guide pulley 51, one should consider the effect of the rear derailleur 42 on the position of the tension pulley 75.

When designing an implementation of the drivetrain 20, to avoid the possibility of the drive chain 35 recuperation capacity of the chain tensioner 41 being exceeded, the expected position of the tensioner chain guide 73 should be determined for all gears, and if there is a rear suspension system, for all travel positions of the rear suspension system. For the exemplary embodiment, the two extremes of the range of possible positions of the tensioner chain guide 73 are when it is rotated furthest clockwise and furthest counter-clockwise when viewed laterally outwardly from the drivetrain 20. The first extreme with the tensioner chain guide 73 rotated furthest clockwise can occur in the highest gear (i.e. when the drive chain 35 is engaged with the smallest sprocket 39) and with the rear suspension system fully extended (i.e. at 0% of travel). The second extreme with the tensioner chain guide 73 rotated furthest counter-clockwise can occur in the lowest gear (i.e. when the drive chain 35 is engaged with the largest sprocket 40) and with the rear suspension system fully compressed (i.e. at 100% of travel). The configurations of the drivetrain 20 shown in FIG. 14 assume no rear suspension system or a fixed travel position of a rear suspension system.

The interaction of the components of the drivetrain 20 determines the drive chain 35 recuperation capacity of the chain tensioner 41. For instance, the position of the portion of drive chain 35 that extends between the chainring sprocket 34 and the idler pulley 119 can determine how far forward the tensioner chain guide 73 can rotate clockwise when viewed laterally outwardly from the drivetrain 20. The position of this portion of the drive chain 35 depends on the position and size of both the idler pulley 119 and the chainring sprocket 34. The geometry of the drivetrain 20 as a whole should be taken into account when determining the drive chain 35 recuperation capacity of the chain tensioner 41 and the operational range of motion of the tensioner chain guide 73.

Second Embodiment

In the following description of alternate embodiments, a reference numeral to be assigned to a given member is the same as that assigned to its relevant member of the aforementioned exemplary embodiment. However, when a given member is constructed differently from its relevant member of the aforementioned exemplary embodiment, a four-digit reference numeral is assigned to the given member. The four-digit reference numeral is produced by adding digits to the reference numeral assigned to the relevant member of the aforementioned exemplary embodiment.

Figure 15:
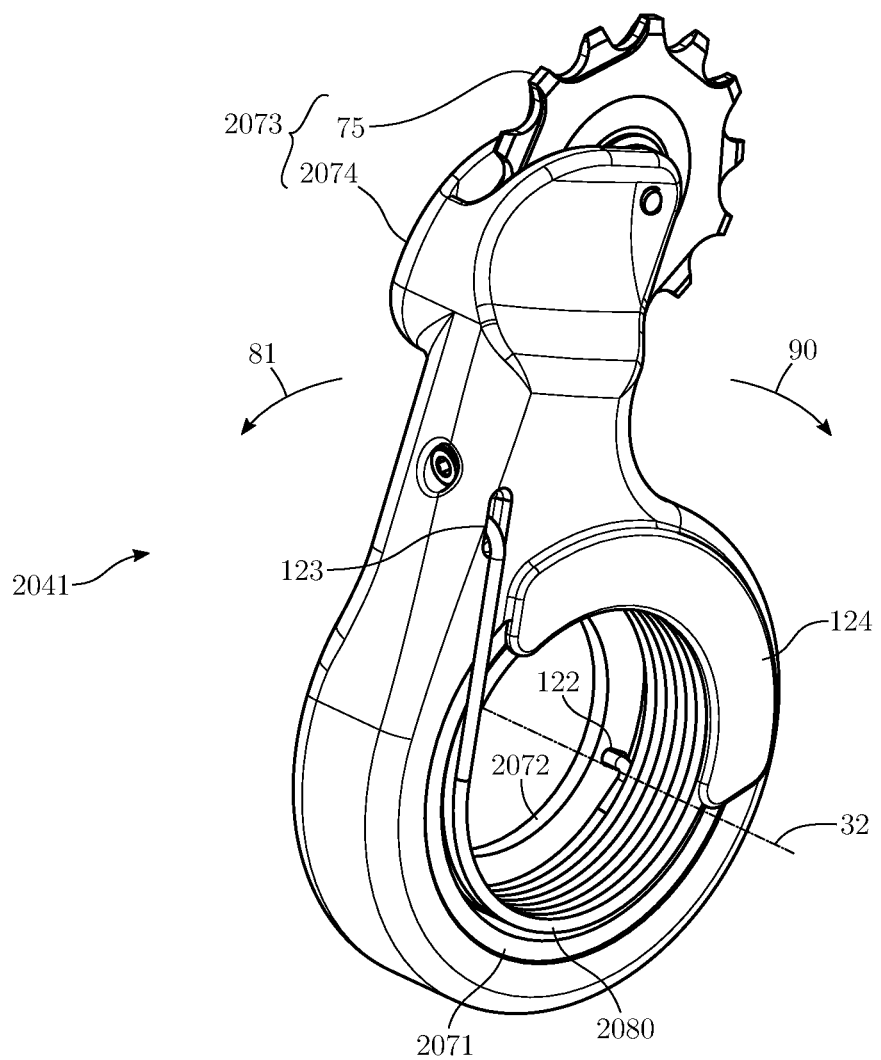
FIG. 15 is an isometric view of the back side of the chain tensioner in accordance with a second embodiment.

FIG. 15 is an isometric view of the back side of a chain tensioner 2041 in accordance with a second embodiment. The chain tensioner 2041 includes a tensioner base member 2071 that is attached to the bottom bracket shell 25 in a similar fashion to the tensioner base member 71 of the first embodiment: a flange 2072 of the tensioner base member 2071 is axially compressed between the bottom bracket shell 25 and a bottom bracket that threads into the bottom bracket shell 25 (both the bottom bracket and the bottom bracket shell 25 are not shown in FIG. 15). However, other configurations for attaching the tensioner base member 2071 to the bottom bracket shell 25 are within the scope of the present disclosure.

Unlike the tensioner biasing element 80 of the first embodiment, the tensioner biasing element 2080 of the chain tensioner 2041 is a torsion spring. The tensioner biasing element 2080 serves the same function as the biasing assembly 79 of the first embodiment of biasing the tensioner chain guide 2073 in the chain tensioning direction 81. The wound part of the torsion spring that is the tensioner biasing element 2080 is located in the inner circumference of the chain tensioner 2041, radially between the bottom bracket shell 25 (not shown) and the chain tensioner 2041 (excluding the flange 2072). As shown in FIG. 15, one end of the tensioner biasing element 2080 is fixed to the tensioner base member 2071 at a first spring mount 122, and another end of the tensioner biasing element 2080 is fixed to the tensioner chain guide body 2074 at a second spring mount 123.

The tensioner chain guide body 2074 includes a spring retention plate 124 to keep the tensioner biasing element 2080 correctly positioned in the chain tensioner 2041. Without the spring retention plate 124, the tensioner biasing element 2080 risks unwinding out of the chain tensioner 2041 when the chain tensioner 2041 is not exerting torque (i.e. when it is fully retracted). This can occur, for example, during installation and maintenance of the drivetrain 20. The spring retention plate 124 could alternatively be a separate component that is joined to the tensioner chain guide body 2074 by suitable fasteners.

The chain tensioner 2041 has a tensioner bearing and a damper (both not shown) that are constructed in the same way as those of the first embodiment, except that the diameters of the tensioner bearing and the one-way clutch assembly are increased to create clearance for the wound part of the tensioner biasing element 2080.

Compared to the chain tensioner 41 of the first embodiment, the chain tensioner 2041 is more simply constructed; however, the chain tensioner 2041 can produce more variation in tension of the drive chain 35 throughout the operational range of motion of the tensioner chain guide 2073.

Third Embodiment

In the first embodiment, the tensioner chain guide 73 rotates about the bottom bracket shell axis 32; however, the tensioner chain guide 73 can be configured for moving in any other way for accomplishing a desired functionality. Also, in the first embodiment, the chain tensioner 41 is mounted to the bottom bracket shell 25; however, the chain tensioner 41 can be mounted elsewhere on the bicycle 21, such as on the rear frame portion 24 or elsewhere than the bottom bracket shell 25 on the front frame portion 23.

Figure 16:
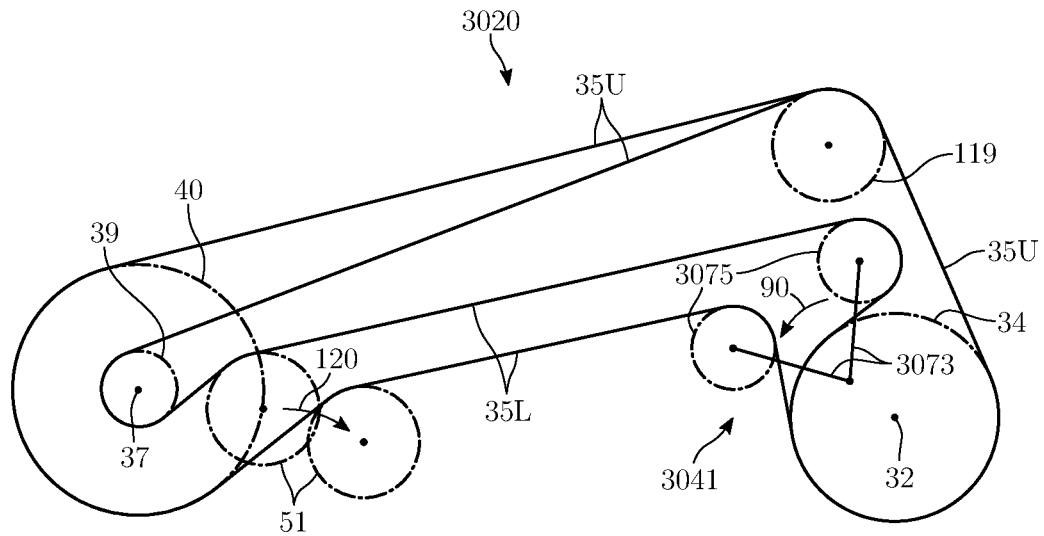
FIG. 16 is a side elevational schematic functional view of the drivetrain in high and low gear configurations in accordance with a third embodiment.

A third embodiment is depicted in FIG. 16, which is a side elevational schematic functional view of a drivetrain 3020 in high and low gear configurations, depicting chain paths and the motion of the derailleur chain guide 50 and the motion of a tensioner chain guide 3073 between said gear configurations. FIG. 16 is referenced below.

The tensioner chain guide 3073 rotates about an axis that is eccentric to the bottom bracket shell axis 32 and that is located generally rearward of the bottom bracket shell axis 32. Otherwise, the chain tensioner 3041 of the third embodiment operates similarly to the chain tensioner 41 of the first embodiment. The tensioner chain guide 3073 is biased by a tensioner biasing element in a clockwise direction when viewed as in FIG. 16, and the rotation axis of the tension pulley 3075 is located generally above the pivot axis of the tensioner chain guide 3073.

In the third embodiment shown in FIG. 16, the number of teeth of the tension pulley 3075 is 12 (the diameter of the circle representing the tension pulley 3075 corresponds to its tooth count). However, other numbers of teeth for the tension pulley 3075 are within the scope of the present disclosure.

Different ways of constructing the chain tensioner 3041 are made possible by the pivot axis of the tensioner chain guide 3073 being eccentric to the bottom bracket shell axis 32 and sufficiently distanced from the bottom bracket shell axis 32. For example, compared to the previously discussed embodiments, the distance between the pivot axis of the tensioner chain guide 3073 and the rotation axis of the tension pulley 3075 can be shorter, the one-way clutch assembly can be more compact, and if a torsion spring is used (such as in the second embodiment), the torsion spring can also be more compact.

Fourth Embodiment

Figure 17:
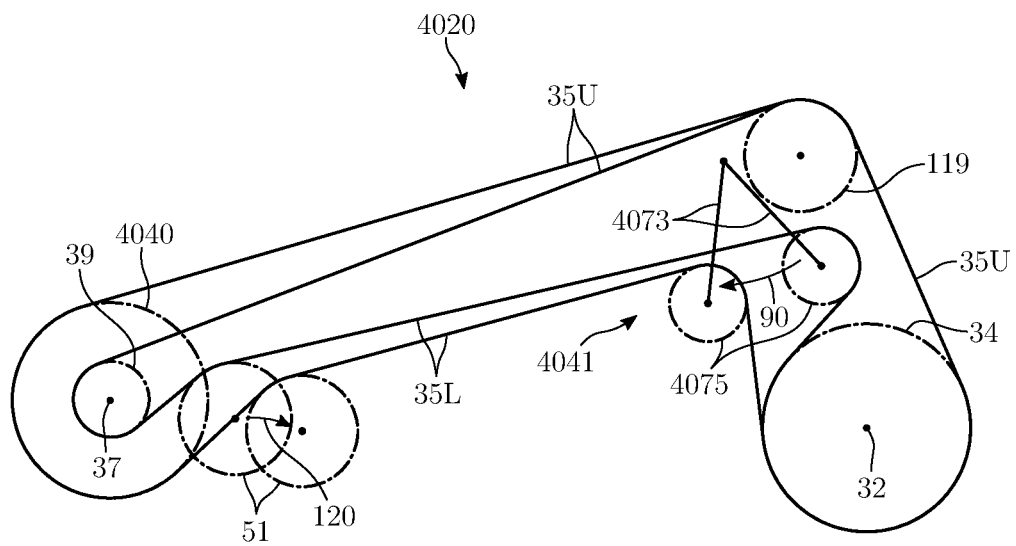
FIG. 17 is a side elevational schematic functional view of the drivetrain in high and low gear configurations in accordance with a fourth embodiment.

A fourth embodiment is depicted in FIG. 17, which is a side elevational schematic functional view of a drivetrain 4020 in high and low gear configurations, depicting chain paths and the motion of the derailleur chain guide 50 and the motion of a tensioner chain guide 4073 between said gear configurations. FIG. 17 is referenced below.

Unlike the first, second, and third embodiments in which the tensioner chain guides 73, 2073, 3073 are biased by a tensioner biasing element in a clockwise direction, the tensioner chain guide 4073 of the fourth embodiment is biased by a tensioner biasing element in a counter-clockwise direction when viewed as in FIG. 17. Also, the rotation axis of the tension pulley 4075 is located generally below the pivot axis of the tensioner chain guide 4073.

In the fourth embodiment shown in FIG. 17, the number of teeth of the largest sprocket 4040 of the cassette is 28 and the number of teeth of the tension pulley 4075 is 11. However, other numbers of teeth for the largest sprocket 4040 and the tension pulley 4075 are within the scope of the present disclosure.

The chain tensioner 4041 can be mounted to a rear frame portion of a bicycle. For example, if integrated into the frame 22 of the first exemplary embodiment, the chain tensioner 4041 could be pivotably mounted to the rear frame portion 24, generally rearward of the suspension pivot 30 shown in FIG. 1. However, other mounting locations of the chain tensioner 4041 are within the scope of the present disclosure.

Fifth Embodiment

Figure 18:
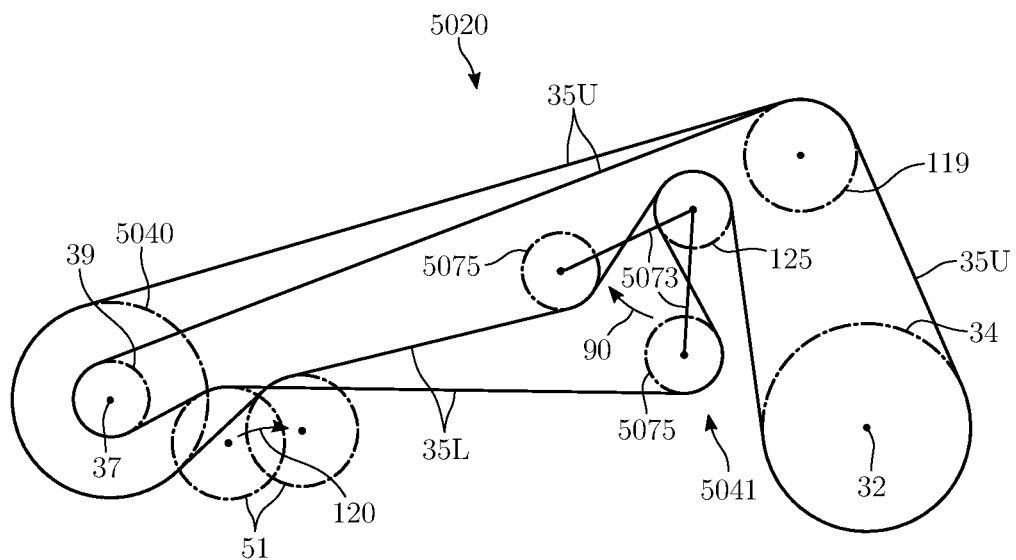
FIG. 18 is a side elevational schematic functional view of the drivetrain in high and low gear configurations in accordance with a fifth embodiment.

A fifth embodiment is depicted in FIG. 18, which is a side elevational schematic functional view of a drivetrain 5020 in high and low gear configurations, depicting chain paths and the motion of the derailleur chain guide 50 and the motion of a tensioner chain guide 5073 between said gear configurations. FIG. 18 is referenced below.

The configuration of the tensioner chain guide 5073 is similar to that of the tensioner chain guide 4073 of the fourth embodiment. This means that the tensioner chain guide 5073 is biased by a tensioner biasing element in a counter-clockwise direction when viewed as in FIG. 18, and that the rotation axis of the tension pulley 5075 is located generally below the pivot axis of the tensioner chain guide 5073. However, in the fifth embodiment, a second tension pulley 125 is rotatably mounted to the frame 22 of the bicycle 21 for rotation around an axis that is substantially coaxial with the pivot axis of the tensioner chain guide 5073. The drive chain 35 is carried above the second tension pulley 125 and below the tension pulley 5075.

Alternatively to what is shown in FIG. 18, the second tension pulley 125 can be eccentric to the pivot axis of the tensioner chain guide 5073, and it can be part of the tensioner chain guide 5073. If the second tension pulley 125 were to be both eccentric to the pivot axis of the tensioner chain guide 5073 and part of the tensioner chain guide 5073, it would pivot around the pivot axis of the tensioner chain guide 5073 upon actuation of the tensioner chain guide 5073.

In the fifth embodiment shown in FIG. 18, the number of teeth of the largest sprocket 5040 is 28, and the number of teeth of both the tension pulley 5075 and the second tension pulley 125 is 11. However, other numbers of teeth for the largest sprocket 5040, the tension pulley 5075, and the second tension pulley 125 are within the scope of the present disclosure.

Similarly to the chain tensioner 4041 of the fourth embodiment, the chain tensioner 5041 can be mounted to the rear frame portion of a bicycle, and other mounting locations of the chain tensioner 5041 are within the scope of the present disclosure.

Sixth Embodiment

Figure 19:
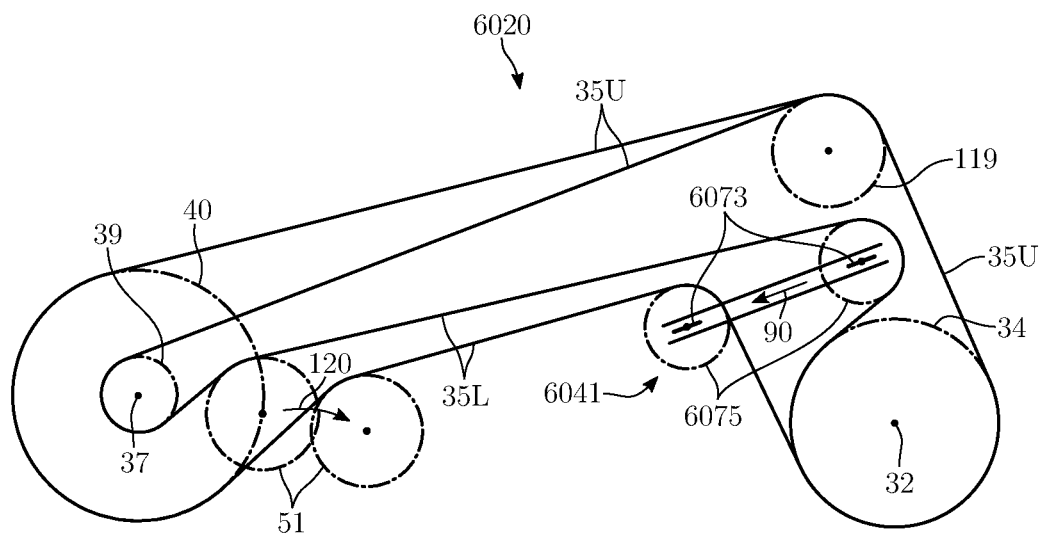
FIG. 19 is a side elevational schematic functional view of the drivetrain in high and low gear configurations in accordance with a sixth embodiment.

A sixth embodiment is depicted in FIG. 19, which is a side elevational schematic functional view of a drivetrain 6020 in high and low gear configurations, depicting chain paths and the motion of the derailleur chain guide 50 and the motion of a tensioner chain guide 6073 between said gear configurations. FIG. 19 is referenced below.

In the sixth embodiment, the tensioner chain guide 6073 is configured to move along a linear path. From the highest to lowest gear configuration, the tensioner chain guide 6073 moves from a position generally between the idler pulley 119 and the chainring sprocket 34 to a position located farther toward the rear of the bicycle 21.

The chain tensioner 6041 includes a slide mechanism, and this slide mechanism can include a rail and a rail bearing. The rail is mounted to the frame 22 of the bicycle 21, and the rail bearing supports the tensioner chain guide 6073 with respect to the rail so that the tensioner chain guide 6073 can slide along the rail. The rail is depicted in FIG. 19 as two parallel lines with one on each side of the arrow 90. The tensioner chain guide 6073 is represented by a short line; similarly to the tensioner chain guides of previously discussed embodiments, the tensioner chain guide 6073 includes a tension pulley 6075.

The chain tensioner 6041 can be mounted to the rear frame portion 24, front frame portion 23, or any other part of the bicycle 21.

In the sixth embodiment shown in FIG. 19, the number of teeth of the tension pulley 6075 is 12. However, other numbers of teeth for the tension pulley 6075 are within the scope of the present disclosure.

Alternatively to what is shown in FIG. 19, the path of the chain tensioner 6041 can be non-linear, and the non-linear path can take any shape. For example, the non-linear path can take the shape of an S or it can take the shape of a curve with a varying radius.

The slide mechanism can be configured for the orientation of the tension pulley 6075 with respect to the center plane of the bicycle 21 to vary as the tensioner chain guide 6073 is actuated along the path. More specifically, both the angle of the tension pulley 6075 with respect to the center plane of the bicycle 21 and the distance of the tension pulley 6075 from the center plane of the bicycle 21 could vary as the tensioner chain guide 6073 is actuated. For example, the orientation of the tension pulley 6075 could vary in such a way that reduces the difference between what is referred to here as the engaging and disengaging drive chain 35 angles. With regard to the tension pulley 6075, the engaging drive chain 35 angle is the angle between the plane of the tension pulley 6075 and the portion of drive chain 35 extended between the chainring sprocket 34 and the tension pulley 6075; and the disengaging drive chain 35 angle is the angle between the plane of the tension pulley 6075 and the portion of drive chain 35 extended between the tension pulley 6075 and the guide pulley 51. Variation of the orientation of the tension pulley 6075 upon actuation of the tensioner chain guide 6073 could serve to decrease friction and noise in the drivetrain 6020.

Advantages

The reader will see that at least one embodiment of the invention provides an improved bicycle drivetrain that combines advantages of both drivetrains with a gearbox (or sealed transmission unit) and drivetrains with a conventional rear derailleur.

Compared to drivetrains with a conventional rear derailleur, the ground clearance of the drivetrain 20 is significantly improved for the various positions of the movable member 45 of the rear derailleur 42 and the various positions of the tensioner chain guide 73 of the chain tensioner 41. It is understood by persons of ordinary skill in the bicycle drivetrain art that the ground clearance of a component refers to the distance from that component to the ground on which the bicycle is resting or being ridden. The greater the ground clearance, the lesser the risk of damage to the component from impacts from protruding trail features or from contacting the ground while the bicycle is maneuvered.

Compared to conventional rear derailleurs, the length of the rear derailleur 42 is considerably reduced for all positions of the movable member 45. This reduces the potential amount of leverage that a side impact could have on the rear derailleur 42. Side impacts to derailleurs can occur during crashes, for example.

Since the drive chain upper portion 35U is carried by a strategically positioned idler pulley 119, the significant limitation to the possible range of motion of the tensioner chain guides of some prior-art drivetrains is avoided. An example of such a prior-art drivetrain is that which is disclosed by French Patent Number 819,641 and described in the Background section.

Other Exemplary Embodiments (a) For embodiments with a rear suspension system, such as a single-pivot rear suspension system, the idler pulley 119 can be rotatably mounted to a first idler carrier member which is pivotally connected to the front frame portion 23, while a second idler carrier member is pivotally connected to both the rear frame portion 24 and the first idler carrier member. The first and second idler carrier members are movable relative to both the front frame portion 23 and the rear frame portion 24. The idler carrier members constitute a linkage mechanism between the rear frame portion 24 and the front frame portion 23, and this linkage mechanism governs the movement of the idler pulley 119 during suspension travel. Such a linkage mechanism can be used to alter the dynamic behavior of the rear suspension system under pedaling forces.

(b) A slide mechanism can be configured to displace the idler pulley 119 relative to the frame 22 in an axial direction that is substantially parallel with the bottom bracket shell axis 32. When the drivetrain 20 is configured with the drive chain 35 engaged with any of the cassette 36 sprockets, the idler pulley 119 will be displaced to reduce the likelihood of the drive chain 35 being in an excessively oblique position. With such a slide mechanism, the idler pulley 119 can be considered self-aligning (or "floating"). Advantageously, the slide mechanism can reduce the friction and noise in the drivetrain 20 and it can reduce the wear rate of the drive chain 35 and the sprockets engaged with the drive chain upper portion 35U (i.e. the chainring sprocket 34, the cassette 36, and the idler pulley 119).

(c) In the exemplary embodiment, the idler pulley 119, guide pulley 51, and tension pulley 75 are shown as sprockets (i.e. with teeth that engage the drive chain 35). Alternatively, these pulleys can be rollers, and optionally with side flanges. These side flanges are located on either side of the drive chain 35 where it is engaged with the roller and prevent disengagement of the drive chain 35 with the roller (i.e. the side flanges prevent the drive chain 35 from bouncing off or sliding off the roller).

(d) A chain guide can be disposed above the idler pulley 119 to reduce the risk of the drive chain 35 becoming disengaged with the idler pulley 119. This chain guide comprises a first guiding plate, a second guiding plate, and a bridge. The first guiding plate has a first guiding surface. The second guiding plate is closer to the center plane of the bicycle than the first guiding plate and has a second guiding surface facing the first guiding surface to define a chain guiding slot between the first guiding surface and the second guiding surface. The bridge connects the first guiding plate and the second guiding plate. The first guiding plate, second guiding plate, and bridge are disposed generally above the idler pulley 119 so that the drive chain 35 that is engaged with the idler pulley 119 passes through the chain guiding slot.

(e) In the exemplary embodiment, the movable member 45 is movable by means of the parallelogram four-pivot articulation 46. Alternatively, it can be movable by means of one or more linear rails. The one or more linear rails can be oriented at an angle relative to the cassette sprocket axis 37 so that the movable member 45 moves along the profile of the cassette 36. The one or more linear rails are configured for maintaining an adequate gap between the active cassette 36 sprocket and the guide pulley 51 throughout the range of gears.

(f) A replaceable derailleur hanger can be configured in a known manner between the rear derailleur 42 and the frame 22 for mounting the rear derailleur 42 to the frame 22.

(g) The rear derailleur 42 can be mounted to the frame 22 with two or more mounting bolts. Alternatively, an adapter may be configured between the rear derailleur 42 and the frame 22, with the rear derailleur 42 mounted to the adapter by two or more mounting bolts, and with the adapter mounted to the frame 22 also by two or more mounting bolts. In such an embodiment, changing the adapter to one with a different geometry can enable the use of a different set of cassette 36 sprocket sizes.

(h) The orientation of the rear derailleur 42 with respect to the part of the frame 22 to which it is mounted can be adjustable with an adjustment screw. This adjustment can be used to optimize the gap between the guide pulley 51 and the cassette 36 sprockets, thus optimizing gear shift performance for a given set of cassette 36 sprocket sizes.

(i) The bicycle 21 may include a tensioner chain guide 73 locking mechanism that fixes the tensioner chain guide 73 in a certain rotational position with respect to the tensioner base member 71 so that maintenance work may be more easily performed.

(j) Instead of a ratchet and pawl mechanism, the one-way clutch assembly 106 can use a roller clutch or sprag clutch. The scope of the present disclosure includes other types of one-way clutch mechanisms, including one-way clutch mechanisms that operate linearly along a straight path rather than coaxially about an axis.

(k) In the exemplary embodiment, the tensioner cable 84 leaves the housing stop 87 toward the tensioner chain guide 73 at a varying angle depending on the position of the tensioner chain guide 73. In an alternate embodiment, in the area where the tensioner cable 84 leaves the tensioner cable housing 85 toward the tensioner chain guide 73, the tensioner cable 84 can be routed around a cable guide wheel rotatably mounted to the housing stop 87 or the frame 22 of the bicycle 21. This cable guide wheel can decrease friction in the actuation of the tensioner cable 84 in and out of the housing stop 87 and the tensioner cable housing 85.

(l) The damper 105 can use fluid damping for creating frictional resistance in the chain slackening direction 90 of motion of the tensioner chain guide 73. The damper 105 with fluid damping, hereafter referred to as a fluid damper, could operate linearly (for example, in conjunction with the linear operation of the biasing assembly 79) or rotationally (for example, coaxially to the rotation axis of the tensioner chain guide 73). The fluid damper can be configured to produce an amount of frictional resistance that depends on the rate of motion of the tensioner chain guide 73. Also, the fluid damper can be configured to produce an amount of frictional resistance that depends on the position of the tensioner chain guide 73 in its operational range of motion. For example, for the general configuration of the drivetrain 20 depicted in FIG. 14, a decreasing amount of frictional resistance could be produced as the tensioner chain guide 73 is rotated in the chain slackening direction 90.

(m) In the first embodiment, the tensioner cable 84 is operatively connected to the tensioner biasing element 80 and the tensioner chain guide 73. Alternatively, the tensioner biasing element 80 can be an extension or compression spring that is pivotably connected at one end to the tensioner chain guide 73 and pivotably connected at another end to the frame 22 of the bicycle 21. Therefore, the tensioner biasing element 80 can be connected to the tensioner chain guide 73 without an intermediary tensioner cable 84. Optionally, the tensioner biasing element 80 can be linearly extended or compressed between its mounting points on the tensioner chain guide 73 and the frame 22 of the bicycle 21. Similarly to the first embodiment, the perpendicular distance (i.e. lever length) between the axis of rotation of the tensioner chain guide 73 and the force vector from the tensioner biasing element 80 can decrease throughout the operational range of motion of the tensioner chain guide 73 in the chain slackening direction 90. In this alternate embodiment, if the tensioner biasing element 80 is a helical spring, this force vector can be substantially colinear with the centerline of the helical spring. The decrease in lever length constitutes a decrease in mechanical advantage, and it can serve to decrease variation in the tension of the drive chain lower portion 35L throughout the range of motion of the tensioner chain guide 73.

Scope

In understanding the scope of the present invention, the term "comprising" and its derivatives, as used herein, are intended to be open-ended terms that specify the presence of the stated features, elements, components, groups, integers, and/or steps, but do not exclude the presence of other unstated features, elements, components, groups, integers, and/or steps. The foregoing also applies to words having similar meanings, such as the terms "including", "having", and their derivatives. Also, the terms "part", "section", "portion", "member", or "element" when used in the singular can have the dual meaning of a single part or a plurality of parts unless otherwise stated.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present disclosure. The term "attached" or "attaching", as used herein, encompasses configurations in which: (1) an element is directly secured to another element by affixing the element directly to the other element; (2) configurations in which the element is indirectly secured to the other element by affixing the element to the intermediate member(s) which in turn are affixed to the other element; and (3) configurations in which one element is integral with another element, i.e. one element is essentially part of the other element. This definition also applies to words of similar meaning, for example, "joined", "connected", "coupled", "mounted", "bonded", "fixed", and their derivatives. Finally, terms of degree such as "substantially", "about", and "approximately" as used herein mean an amount of deviation of the modified term such that the end result is not significantly changed.

While only selected embodiments have been chosen to illustrate the present invention, it will be apparent to those skilled in the art that various changes and modifications can be made herein without departing from the scope of the invention as defined in the appended claims. For example, unless specifically stated otherwise, the size, shape, location, or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa, unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle drivetrain comprising:
   a) a drive chain which includes an upper portion and a lower portion;
   b) a cassette which comprises a plurality of cassette sprockets including at least a largest sprocket and a smallest sprocket, each including a bottom and sharing a cassette sprocket axis;
   c) at least one chainring sprocket which is in engagement with said drive chain and which includes a bottom;
   d) a rear derailleur configured to be mounted to a frame of a bicycle and configured to move said drive chain between said plurality of cassette sprockets;
   e) a chain tensioner, separate from said rear derailleur and configured to be mounted to said frame, and comprising a tensioner chain guide and a biasing element configured for producing tension on said drive chain, wherein said chain tensioner is configured to engage the lower portion of said drive chain; and
   f) a chain guiding element configured to be mounted to said frame and configured to engage the upper portion of said drive chain, wherein the upper portion of said drive chain is carried above said chain guiding element;
   g) wherein said drive chain is disposed generally above a clearance line.

2. The bicycle drivetrain of claim 1, wherein said clearance line is parallel to and extends along the bottom of a portion of chain that is of the same construction as said drive chain and that extends between and engages with the bottom of said chainring sprocket and the bottom of the largest sprocket of said cassette, such that said clearance line is disposed below said portion of chain.

3. The bicycle drivetrain of claim 2, wherein said chain guiding element is an idler pulley, which includes an idler pulley axis and which is configured to be rotatably connected to said frame for rotation about the idler pulley axis, and wherein the upper portion of said drive chain is carried at least above the axis of said idler pulley.

4. The bicycle drivetrain of claim 3, wherein said rear derailleur comprises:
 a) a base member configured for attachment to said frame;
 b) a movable member;
 c) a linkage coupling said movable member to said base member and configured to permit movement of said movable member relative to said base member, the linkage including four linkage axes; and
 d) a derailleur chain guide disposed on said movable member, said derailleur chain guide movable along the cassette sprocket axis to move said drive chain between said plurality of cassette sprockets.

5. The bicycle drivetrain of claim 4, wherein said derailleur chain guide comprises a guide pulley including a guide pulley axis, wherein the guide pulley axis is substantially parallel to the cassette sprocket axis.

6. The bicycle drivetrain of claim 5, wherein said derailleur chain guide further comprises:
 a) a first guide plate having a first guiding surface;
 b) a second guide plate disposed closer to said movable member than said first guide plate, said second guide plate having a second guiding surface facing said first guiding surface to define a chain guiding slot between said first guiding surface and said second guiding surface; and
 c) a bridge connecting said first guide plate and said second guide plate;
 d) wherein said first guide plate, said second guide plate, and said bridge are disposed generally above said guide pulley.

7. The bicycle drivetrain of claim 4, wherein said tensioner chain guide is configured to be pivotably coupled to said frame such that said tensioner chain guide pivots around an axis that is substantially parallel to a bottom bracket shell axis of said frame, and wherein said biasing element is configured to bias said tensioner chain guide for rotation in a first rotational direction that produces tension on said drive chain.

8. The bicycle drivetrain of claim 7, wherein said chain tensioner further comprises a damper for applying a damping force to said tensioner chain guide when said tensioner chain guide rotates in a second rotational direction opposite to said first rotational direction.

9. The bicycle drivetrain of claim 8, wherein said tensioner chain guide comprises a tension pulley having a tension pulley axis that is substantially parallel to the cassette sprocket axis.

10. The bicycle drivetrain of claim 9, wherein said tensioner chain guide is configured to be pivotably mounted to said frame and is configured to pivot around an axis that is substantially coaxial with the bottom bracket shell axis of said frame.

11. The bicycle drivetrain of claim 10, wherein said derailleur chain guide comprises a guide pulley including a guide pulley axis that is substantially parallel to the cassette sprocket axis.

12. The bicycle drivetrain of claim 11, wherein said derailleur chain guide further comprises:
 a) a first guide plate having a first guiding surface;
 b) a second guide plate disposed closer to said movable member than said first guide plate, said second guide plate having a second guiding surface facing said first guiding surface to define a chain guiding slot between said first guiding surface and said second guiding surface; and
 c) a bridge connecting said first guide plate and said second guide plate;
 d) wherein said first guide plate, said second guide plate, and said bridge are disposed generally above said guide pulley.

13. The bicycle drivetrain of claim 12, wherein said chain tensioner comprises a cable which is operatively connected to said biasing element and said tensioner chain guide, and a cable-anchoring means for connecting a first cable end of said cable to said tensioner chain guide, wherein said tensioner chain guide includes an entrainment surface extending toward the first cable end, a length of said cable proximate the first cable end conforming to said entrainment surface such that the mechanical advantage of said biasing element on said tensioner chain guide is a function of the geometry of said entrainment surface.

14. A bicycle comprising:
 a) a frame which includes a bottom bracket shell axis;
 b) a drive chain which includes an upper portion and a lower portion;
 c) a cassette comprising a plurality of cassette sprockets sharing a cassette sprocket axis;
 d) at least one chainring sprocket which is in engagement with said drive chain;
 e) a rear derailleur mounted to said frame and configured to move said drive chain between said plurality of cassette sprockets;
 f) a chain tensioner, separate from said rear derailleur and mounted to said frame, and comprising a tensioner chain guide and a biasing element configured for producing tension on said drive chain, wherein said chain tensioner engages the lower portion of said drive chain; and
 g) a chain guiding element mounted to said frame, wherein said chain guiding element engages the upper portion of said drive chain, and wherein the upper portion of said drive chain is carried above said chain guiding element;
 h) wherein said drive chain is disposed generally above a clearance line.

15. The bicycle of claim 14, wherein said chain guiding element is an idler pulley, which includes an idler pulley axis and which is rotatably connected to said frame for rotation about the idler pulley axis, and wherein the upper portion of said drive chain is carried at least above the idler pulley axis.

16. The bicycle of claim 15, wherein said rear derailleur comprises:
 a) a base member attached to said frame;
 b) a movable member;
 c) a linkage coupling said movable member to said base member and configured to permit movement of said movable member relative to said base member, the linkage including four linkage axes; and
 d) a derailleur chain guide disposed on said movable member, said derailleur chain guide movable along the cassette sprocket axis to move said drive chain between said plurality of cassette sprockets.

17. The bicycle of claim 16, wherein said tensioner chain guide is pivotably coupled to said frame such that said tensioner chain guide pivots around an axis that is substantially parallel to the bottom bracket shell axis of said frame, and wherein said biasing element is configured to bias said tensioner chain guide for rotation in a first rotational direction that produces tension on said drive chain.

18. The bicycle of claim 17, wherein said chain tensioner further comprises a damper for applying a damping force to said tensioner chain guide when said tensioner chain guide rotates in a second rotational direction opposite to said first rotational direction.

19. The bicycle of claim 18, wherein said tensioner chain guide is pivotably mounted to said frame for pivoting around an axis that is substantially coaxial with the bottom bracket shell axis of said frame.

20. A bicycle drivetrain comprising:
  a) a drive chain which includes an upper portion and a lower portion;
  b) a cassette which comprises a plurality of cassette sprockets including at least a largest sprocket and a smallest sprocket, each including a bottom and sharing a cassette sprocket axis;
  c) at least one chainring sprocket which is in engagement with said drive chain and which includes a bottom;
  d) a rear derailleur configured to be mounted to a frame of a bicycle and configured to move said drive chain between said plurality of cassette sprockets;
  e) a chain tensioner, separate from said rear derailleur and configured to be mounted to said frame, and comprising a tensioner chain guide and a biasing element configured for producing tension on said drive chain, wherein said chain tensioner is configured to engage the lower portion of said drive chain; and
  f) a chain guiding element configured to be mounted to said frame and configured to engage the upper portion of said drive chain, wherein the upper portion of said drive chain is carried above said chain guiding element;
  g) wherein the lower portion of said drive chain is generally disposed at or above the bottom of the largest sprocket of said cassette and engages with the bottom of said chainring sprocket.

* * * * *